(12) United States Patent
Zhang

(10) Patent No.: US 10,630,439 B2
(45) Date of Patent: Apr. 21, 2020

(54) METHOD AND APPARATUS FOR TRANSMITTING REFERENCE SIGNAL IN DEVICE-TO-DEVICE (D2D) COMMUNICATION

(71) Applicant: Huawei Technologies Co., Ltd., Shenzhen (CN)

(72) Inventor: Xingwei Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 127 days.

(21) Appl. No.: 14/639,619

(22) Filed: Mar. 5, 2015

(65) Prior Publication Data
US 2015/0180631 A1 Jun. 25, 2015

Related U.S. Application Data

(63) Continuation of application No. PCT/CN2013/083078, filed on Sep. 6, 2013.

(30) Foreign Application Priority Data

Sep. 6, 2012 (CN) .......................... 2012 1 0327486

(51) Int. Cl.
*H04L 5/00* (2006.01)
*H04W 72/02* (2009.01)

(52) U.S. Cl.
CPC .......... *H04L 5/0048* (2013.01); *H04W 72/02* (2013.01); *H04L 5/0016* (2013.01); *H04L 5/0023* (2013.01)

(58) Field of Classification Search
CPC ...... H04L 5/0048; H04L 5/005; H04L 5/0051
See application file for complete search history.

(56) References Cited

U.S. PATENT DOCUMENTS

| 2008/0075184 A1* | 3/2008 | Muharemovic | H04L 1/1854 375/260 |
| 2008/0267269 A1* | 10/2008 | Enescu | H04L 1/0079 375/219 |
| 2008/0298433 A1* | 12/2008 | Tiirola | H04J 13/0062 375/132 |
| 2010/0074244 A1* | 3/2010 | Luo | H04L 5/0007 370/343 |

(Continued)

FOREIGN PATENT DOCUMENTS

| CN | 101330325 A | 12/2008 |
| CN | 101777941 A | 7/2010 |

(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 10)," 3GPP TS 36.211, V10.5.0, Technical Specification, Jun. 2012, 75 pages.

(Continued)

*Primary Examiner* — Jason E Mattis
*Assistant Examiner* — Hong Shao
(74) *Attorney, Agent, or Firm* — Conley Rose, P.C.

(57) ABSTRACT

A method and an apparatus for transmitting information in device-to-device (D2D) communication are provided, where the method includes determining, by a first user equipment, in a communication resource for D2D communication, a target resource used to bear a reference signal (RS), where the target resource is according to characteristic information used in selecting the target resource, and the characteristic information used in selecting the target resource includes at least one of the following two items: characteristic information used to uniquely identify the first user equipment, and characteristic information used to uniquely identify a second user equipment that performs D2D communication with the first user equipment; and transmitting, by the first user equipment, the RS to the second user equipment using the target resource.

10 Claims, 9 Drawing Sheets

(56) References Cited

U.S. PATENT DOCUMENTS

| | | | |
|---|---|---|---|
| 2010/0080187 A1 | 4/2010 | Papasakellariou et al. | |
| 2010/0111018 A1* | 5/2010 | Chang | H04B 7/15585 370/329 |
| 2010/0165882 A1 | 7/2010 | Palanki et al. | |
| 2011/0090862 A1 | 4/2011 | Liang et al. | |
| 2011/0268077 A1 | 11/2011 | Wan et al. | |
| 2011/0268101 A1* | 11/2011 | Wang | H04L 5/0053 370/344 |
| 2012/0201187 A1 | 8/2012 | Koo et al. | |
| 2012/0275406 A1* | 11/2012 | Ji | H04L 5/0037 370/329 |
| 2012/0281576 A1* | 11/2012 | Yamada | H04L 1/0046 370/252 |
| 2013/0235754 A1* | 9/2013 | Lim | H04W 72/042 370/252 |
| 2013/0273926 A1* | 10/2013 | Peng | H04B 7/15528 455/450 |
| 2014/0003262 A1* | 1/2014 | He | H04W 28/08 370/252 |
| 2015/0063294 A1 | 3/2015 | Noh et al. | |

FOREIGN PATENT DOCUMENTS

| | | | | |
|---|---|---|---|---|
| CN | 101800572 A | 8/2010 | | |
| CN | 101835263 A | 9/2010 | | |
| CN | 102006107 A | 4/2011 | | |
| CN | 102239649 A | 11/2011 | | |
| CN | 102265699 A | 11/2011 | | |
| CN | 102404854 A | 4/2012 | | |
| CN | 102469604 A | 5/2012 | | |
| JP | WO 2011065442 A1 * | 6/2011 | ........... | H04L 1/0046 |
| WO | 2008036977 A2 | 3/2008 | | |
| WO | 2011050519 A1 | 5/2011 | | |
| WO | 2011116815 A1 | 9/2011 | | |
| WO | WO 2012057547 A2 * | 5/2012 | .......... | H04W 72/042 |

OTHER PUBLICATIONS

"3rd Generation Partnership Project; Technical Specification Group Radio Access Network; Evolved Universal Terrestrial Radio Access (E-UTRA); Multiplexing and channel coding (Release 10)," 3GPP TS 36.212, V10.6.0, Technical Specification, Jun. 2012, 79 pages.

Foreign Communication From a Counterpart Application, PCT Application No. PCT/CN2013/083078, English Translation of International Search Report dated Dec. 5, 2013, 2 pages.

Foreign Communication From a Counterpart Application, PCT Application No. PCT/CN2013/083078, English Translation of Written Opinion dated Dec. 5, 2013, 7 pages.

Foreign Communication From a Counterpart Application, Chinese Application No. 201210327486.0, Chinese Search Report dated Sep. 7, 2016, 2 pages.

Foreign Communication From a Counterpart Application, Chinese Application No. 201210327486.0, Chinese Office Action dated Sep. 19, 2016, 4 pages.

Fodor, G., et al., "Design Aspects of Network Assisted Device-to-Device Communications," IEEE Communications Magazine, vol. 50, No. 3, Mar. 2012, pp. 170-177.

Foreign Communication From a Counterpart Application, European Application No. 13834509.5, Extended European Search Report dated Jul. 22, 2015, 9 pages.

CATT, "Further details on UE-specific UL DMRS," XP050562686, 3GPP TSG RAN WG1 Meeting #68, R1-120106, Jan. 31, 2012, 4 pages.

Foreign Communication From a Counterpart Application, European Application No. 13834509.5, European Office Action dated Feb. 26, 2018, 6 pages.

Machine Translation and Abstract of Chinese Publication No. CN101800572, Aug. 11, 2010, 27 pages.

Machine Translation and Abstract of Chinese Publication No. CN101835263, Sep. 15, 2010, 14 pages.

Machine Translation and Abstract of Chinese Publication No. CN102006107, Apr. 6, 2011, 26 pages.

Machine Translation and Abstract of Chinese Publication No. CN102404854, Apr. 4, 2012, 20 pages.

Machine Translation and Abstract of Chinese Publication No. CN102469604, May 23, 2012, 16 pages.

Foreign Communication From a Counterpart Application, Chinese Application No. 201710364811.3, Chinese Office Action dated Sep. 27, 2019, 11 pages.

* cited by examiner

100

A first user equipment determines, in a communication resource for D2D communication, a target resource used to carry a reference signal RS, where the target resource is determined by characteristic information used in selecting the target resource, and the characteristic information used in selecting the target resource includes at least one of the following two items: characteristic information used to uniquely identify the first user equipment, and characteristic information used to uniquely identify a second user equipment that performs D2D communication with the first user equipment ~ S110

The first user equipment transmits the RS to the second user equipment by using the target resource ~ S120

S210. Acquire characteristic information used in selecting a target resource, where the characteristic information used in selecting the target resource includes at least one of the following two items: characteristic information used to uniquely identify the first user equipment, and characteristic information used to uniquely identify a second user equipment that performs D2D communication with the first user equipment ⟶ S210

Select, from a communication resource used for the D2D communication, according to the characteristic information used in selecting the target resource, the target resource used to carry a reference signal RS ⟶ S220

Send fifth indication information to at least one user equipment of the first user equipment and the second user equipment, where the fifth information is used to indicate the characteristic information used in selecting the target resource, so that the at least one user equipment determines, according to the fifth information, the target resource used to carry an RS; or send sixth indication information to the at least one user equipment, where the sixth information is used to indicate the target resource, so that the at least one user equipment determines, according to the sixth information, the target resource used to carry an RS ⟶ S230

FIG. 4

METHOD AND APPARATUS FOR TRANSMITTING REFERENCE SIGNAL IN DEVICE-TO-DEVICE (D2D) COMMUNICATION

CROSS-REFERENCE TO RELATED APPLICATIONS

This application is a continuation of International Application No. PCT/CN2013/083078, filed on Sep. 6, 2013, which claims priority to Chinese Patent Application No. 201210327486.0, filed on Sep. 6, 2012, both of which are hereby incorporated by reference in their entireties.

TECHNICAL FIELD

The present invention relates to the communications field, and more specifically, relates to a method and an apparatus for transmitting a reference signal in device-to-device (D2D) communication.

BACKGROUND

At present, a D2D communication technology is available. In this type of communication mode, terminals (such as user equipment (UE)) can directly communicate with each other, which does not require forwarding by a base station (such as an evolved Node B (eNB)) and shares data load of the base station. Because D2D communication has only one hop and does not need an intermediate device, the D2D communication can better utilize a spectrum resource, improve spectrum utilization and a data rate, and also reduces load of a base station.

In order to improve spectrum utilization and maximize use of a radio-frequency capability of an existing terminal, a D2D communication link may share a target resource with an existing communications system. To avoid interfering with another terminal in the system, D2D communication does not use a downlink resource (a link from a base station to a terminal) of the communications system, but only reuses an uplink resource (a link from a terminal to a base station) of the communications system because an interference immunity of a base station is much stronger than that of a common terminal. There is a relatively high likelihood that two D2D devices perform communication by means of time division multiplexing on the uplink resource, which does not require support for simultaneous receiving or sending, and requires only that while one device sends data, the other device receives data.

In an existing communications system, a target resource for bearing a reference signal (RS) is fixed, for example, an uplink demodulation reference signal (UL DRS) is carried by two symbols (an example of the target resource), where the two symbols are separately located in the middle of each timeslot. Therefore, for transmission of an RS in a D2D communication link, a method for transmitting an UL RS in the existing communications system may be used, that is, transmission is performed using a symbol in the middle of each timeslot.

However, because a location of a symbol used to transmit an RS is fixed between two timeslots, when the number of terminal pairs that perform D2D communication is relatively large, there is a problem that resources for bearing RSs are insufficient.

SUMMARY

Embodiments of the present invention provide a method and an apparatus for transmitting a reference signal in D2D communication, which can ensure transmission of a reference signal between each terminal pair.

According to a first aspect, a method for transmitting a reference signal in D2D communication is provided, where the method includes determining, by a first user equipment, in a communication resource for D2D communication, a target resource used to bear an RS, where the target resource is according to characteristic information used in selecting the target resource, and the characteristic information used in selecting the target resource includes at least one of the following two items: characteristic information used to uniquely identify the first user equipment, and characteristic information used to uniquely identify a second user equipment that performs D2D communication with the first user equipment; and transmitting, by the first user equipment, the RS to the second user equipment using the target resource.

In a possible implementation manner, the determining, by a first user equipment, in a communication resource for D2D communication, a target resource used to bear an RS includes selecting, by the first user equipment, the target resource according to the characteristic information used in selecting the target resource; and before the transmitting, by the first user equipment, the RS to the second user equipment using the target resource, the method further includes sending first information to the second user equipment, where the first information is used to indicate the characteristic information used in selecting the target resource by the first user equipment, so that the second user equipment determines the target resource according to the first information; or sending second information to the second user equipment, where the second information is used to indicate the target resource, so that the second user equipment determines the target resource according to the second information.

With reference to the first aspect and the first possible implementation manner, in a second possible implementation manner, the selecting, by the first user equipment, the target resource from the communication resource according to the characteristic information used in selecting the target resource includes selecting, by the first user equipment, a target pattern from at least two preset patterns according to the characteristic information used in selecting the target resource, where each pattern is used to indicate a resource that is in the communication resource and used to bear an RS, and using a resource indicated by the target pattern and used to bear an RS as the target resource, where the second information is used to indicate the target pattern.

With reference to the first aspect, the first possible implementation manner, and the second possible implementation manner, in a third possible implementation manner, the selecting, by the first user equipment, the target resource from the communication resource according to the characteristic information used in selecting the target resource includes determining, by the first user equipment, a deviation value according to the characteristic information used in selecting the target resource, where the deviation value is used to indicate a deviation, in a preset pattern, of the target resource relative to a preset resource used to bear an RS, and determining the target resource according to the deviation value and the pattern, where the second information is used to indicate the deviation value.

With reference to the first aspect, the first possible implementation manner, the second possible implementation manner, and the third possible implementation manner, in a fourth possible implementation manner, the selecting, by the first user equipment, the target resource from the communication resource according to the characteristic information used in selecting the target resource includes determining, by the first user equipment, a configured value according to the characteristic information used in selecting the target resource, where the configured value is used to indicate a position of the target resource in a preset pattern, and determining the target resource according to the configured value and the pattern, where the second information is used to indicate the configured value.

With reference to the first aspect, the first possible implementation manner, the second possible implementation manner, the third possible implementation manner, and the fourth possible implementation manner, in a fifth possible implementation manner, the target resource is selected from the communication resource by the second user equipment according to the characteristic information used in selecting the target resource; and the determining, by a first user equipment, in a communication resource for D2D communication, a target resource used to bear an RS includes receiving, by the first user equipment, third information sent by the second user equipment, where the third information is used to indicate the characteristic information used in selecting the target resource by the second user equipment, and determining the target resource according to the third information; or, receiving, by the first user equipment, fourth information sent by the second user equipment, where the fourth information is used to indicate the target resource, and determining the target resource according to the fourth information.

With reference to the first aspect, the first possible implementation manner, the second possible implementation manner, the third possible implementation manner, the fourth possible implementation manner, and the fifth possible implementation manner, in a sixth possible implementation manner, the target resource is selected from the communication resource by a base station device according to the characteristic information used in selecting the target resource; and the determining, by a first user equipment, a target resource includes receiving, by the first user equipment, fifth information sent by the base station device, where the fifth information is used to indicate the characteristic information used in selecting the target resource by the base station device, and determining the target resource according to the fifth information; or, receiving, by the first user equipment, sixth information sent by the base station device, where the sixth information is used to indicate the target resource, and determining the target resource according to the sixth information.

With reference to the first aspect, the first possible implementation manner, the second possible implementation manner, the third possible implementation manner, the fourth possible implementation manner, the fifth possible implementation manner, and the sixth possible implementation manner, in a seventh possible implementation manner, the target resource includes at least one of a time domain resource, a frequency domain resource, a space domain resource, and a code domain resource.

According to a second aspect, a method for transmitting a reference signal in D2D communication is provided, where the method includes acquiring characteristic information used in selecting a target resource, where the characteristic information used in selecting the target resource includes at least one of the following two items: characteristic information used to uniquely identify a first user equipment, and characteristic information used to uniquely identify a second user equipment that performs D2D communication with the first user equipment; selecting, from a communication resource for the D2D communication according to the characteristic information used in selecting the target resource, the target resource used to bear a RS; and sending fifth information to at least one user equipment of the first user equipment and the second user equipment, where the fifth information is used to indicate the characteristic information used in selecting the target resource, so that the at least one user equipment determines, according to the fifth information, the target resource used to bear the RS; or sending sixth indication information to the at least one user equipment, where the sixth information is used to indicate the target resource, so that the at least one user equipment determines, according to the sixth information, the target resource used to bear the RS.

In a possible implementation manner, the selecting, from a communication resource for the D2D communication according to the characteristic information used in selecting the target resource, the target resource used to bear an RS includes selecting a target pattern from at least two preset patterns according to the characteristic information used in selecting the target resource, where each pattern is used to indicate a resource that is in the communication resource and used to bear an RS, and using a resource indicated by the target pattern and used to bear an RS as the target resource, where the sixth information is used to indicate the target pattern.

With reference to the second aspect and the first possible implementation manner, in a second possible implementation manner, the selecting, from a communication resource for the D2D communication according to the characteristic information used in selecting the target resource, the target resource used to bear an RS includes determining a deviation value according to the characteristic information used in selecting the target resource, where the deviation value is used to indicate a deviation, in a preset pattern, of the target resource relative to a preset resource used to bear an RS; and determining the target resource according to the deviation value and the pattern, where the sixth information is used to indicate the deviation value.

With reference to the second aspect, the first possible implementation manner, and the second possible implementation manner, in a third possible implementation manner, the selecting, from a communication resource for the D2D communication according to the characteristic information used in selecting the target resource, the target resource used to bear an RS includes determining a configured value according to the characteristic information used in selecting the target resource, where the configured value is used to indicate a location of the target resource in a preset pattern; and determining the target resource according to the configured value and the pattern, where the sixth information is used to indicate the configured value.

With reference to the second aspect, the first possible implementation manner, the second possible implementation manner, and the third possible implementation manner, in a fourth possible implementation manner, the target resource includes at least one of a time domain resource, a frequency domain resource, a space domain resource, or a code domain resource.

According to a third aspect, an apparatus for transmitting a reference signal in D2D communication is provided, where the apparatus includes a processing unit configured to enable a first user equipment to determine, from a communication resource for D2D communication, a target resource used to bear a RS, and control a receiving unit and a sending unit to transmit the RS using the target resource, where the target resource is according to characteristic information used in selecting the target resource, and the characteristic information used in selecting the target resource includes at least one of the following two items: characteristic information used to uniquely identify a first user equipment, and characteristic information used to uniquely identify a second user equipment that performs D2D communication with the first user equipment; the receiving unit configured to receive the RS; and the sending unit configured to send the RS.

In a possible implementation manner, the processing unit is configured to select the target resource from the communication resource according to the characteristic information used in selecting the target resource; and the sending unit is further configured to send first information to the second user equipment, where the first information is used to indicate the characteristic information used in selecting the target resource by the first user equipment, so that the second user equipment determines the target resource according to the first information; or is configured to send second information to the second user equipment, where the second information is used to indicate the target resource, so that the second user equipment determines the target resource according to the second information.

With reference to the third aspect and the first possible implementation manner, in a second possible implementation manner, the processing unit is configured to select a target pattern from at least two preset patterns according to the characteristic information used in selecting the target resource, where each pattern is used to indicate a resource that is in the communication resource and used to bear an RS; and is configured to use a resource indicated by the target pattern and used to bear an RS as the target resource, where the second information is used to indicate the target pattern.

With reference to the third aspect, the first possible implementation manner and the second possible implementation manner, in a third possible implementation manner, the processing unit is configured to determine a deviation value according to the characteristic information used in selecting the target resource, where the deviation value is used to indicate a deviation, in a preset pattern, of the target resource relative to a preset resource used to bear an RS; and is configured to determine the target resource according to the deviation value and the pattern, where the second information is used to indicate the deviation value.

With reference to the third aspect, the first possible implementation manner, the second possible implementation manner, and the third possible implementation manner, in a fourth possible implementation manner, the processing unit is configured to determine a configured value according to the characteristic information used in selecting the target resource, where the configured value is used to indicate a location of the target resource in a preset pattern; and determining the target resource according to the configured value and the pattern, where the second information is used to indicate the configured value.

With reference to the third aspect, the first possible implementation manner, the second possible implementation manner, the third possible implementation manner, and the fourth possible implementation manner, in a fifth possible implementation manner, the target resource is selected from the communication resource by the second user equipment according to the characteristic information used in selecting the target resource, the receiving unit is further configured to receive third information sent by the second user equipment, where the third information is used to indicate the characteristic information used in selecting the target resource by the second user equipment, and the processing unit is further configured to determine the target resource according to the third information; or, the receiving unit is further configured to receive fourth information sent by the second user equipment, where the fourth information is used to indicate the target resource, and the processing unit is further configured to determine the target resource according to the fourth information.

With reference to the third aspect, the first possible implementation manner, the second possible implementation manner, the third possible implementation manner, the fourth possible implementation manner, and the fifth possible implementation manner, in a sixth possible implementation manner, the target resource is selected by a base station device according to the characteristic information used in selecting the target resource, the receiving unit is further configured to receive fifth information sent by the base station device, where the fifth information is used to indicate the characteristic information used in selecting the target resource by the base station device, and the processing unit is further configured to determine the target resource according to the fifth information; or, the receiving unit is further configured to receive sixth information sent by the base station device, where the sixth information is used to indicate the target resource, and the processing unit is further configured to determine the target resource according to the sixth information.

With reference to the third aspect, the first possible implementation manner, the second possible implementation manner, the third possible implementation manner, the fourth possible implementation manner, the fifth possible implementation manner, and the sixth possible implementation manner, in a seventh possible implementation manner, the target resource includes at least one of a time domain resource, a frequency domain resource, a space domain resource, and a code domain resource.

According to a fourth aspect, an apparatus for transmitting a reference signal in D2D communication is provided, where the apparatus includes an acquiring unit configured to acquire characteristic information used in selecting a target resource, where the characteristic information used in selecting the target resource includes at least one of the following two items: characteristic information used to uniquely identify the first user equipment, and characteristic information used to uniquely identify a second user equipment that performs D2D communication with the first user equipment; a processing unit configured to select, from a communication resource for the D2D communication according to the characteristic information used in selecting the target resource, the target resource used to bear a RS; and a sending unit configured to send fifth information to at least one user equipment of the first user equipment and the second user equipment, where the fifth information is used to indicate the characteristic information used in selecting the target resource, so that the at least one user equipment determines, according to the fifth information, the target resource used to bear the RS; or send sixth indication information to the at least one user equipment, where the sixth information is used to indicate the target resource, so that the at least one user equipment determines, according to the sixth information, the target resource used to bear the RS.

In a possible implementation manner, the processing unit is configured to select a target pattern from at least two preset patterns according to the characteristic information used in selecting the target resource, where each pattern is used to indicate an RS resource that is in the communication resource and used to bear an RS; and is configured to use an RS resource indicated by the target pattern as the target resource, where the sixth information is used to indicate the target pattern.

With reference to the fourth aspect and the first possible implementation manner, in a second possible implementation manner, the processing unit is configured to determine a deviation value according to the characteristic information used in selecting the target resource, where the deviation value is used indicate a deviation, in a preset pattern, of the target resource relative to a preset RS resource used to bear an RS, and the pattern is used to indicate an RS resource that is in the communication resource and used to bear an RS; and determine the target resource according to the deviation value, where the sixth information is used to indicate the deviation value.

With reference to the fourth aspect, the first possible implementation manner, and the second possible implementation manner, in a third possible implementation manner, the processing unit is configured to determine a configured value according to the characteristic information used in selecting the target resource, where the configured value is used indicate a location of the target resource in the communication resource; and determine the target resource according to the configured value, where the sixth information is used to indicate the configured value.

With reference to the fourth aspect, the first possible implementation manner, the second possible implementation manner, and the third possible implementation manner, in a fourth possible implementation manner, the target resource includes at least one of a time domain resource, a frequency domain resource, a space domain resource, or a code domain resource.

In the method and the apparatus for transmitting a reference signal according to the embodiments of the present invention, a target resource used to bear a reference signal is determined according to characteristic information of a user equipment that performs D2D communication, which can implement dynamic configuration of a resource, so that transmission of a reference signal between each terminal pair can still be ensured even in a case in which the number of terminal pairs that perform D2D communication is relatively large.

BRIEF DESCRIPTION OF DRAWINGS

To describe the technical solutions in the embodiments of the present invention more clearly, the following briefly introduces the accompanying drawings required for describing the embodiments of the present invention. The accompanying drawings in the following description show merely some embodiments of the present invention, and a person of ordinary skill in the art may still derive other drawings from these accompanying drawings without creative efforts.

FIG. 1 is a schematic flowchart of a method for transmitting a reference signal in D2D communication according to an embodiment of the present invention;

FIG. 4 is a schematic flowchart of a method for transmitting a reference signal in D2D communication according to another embodiment of the present invention;

DESCRIPTION OF EMBODIMENTS

Figure 2A:
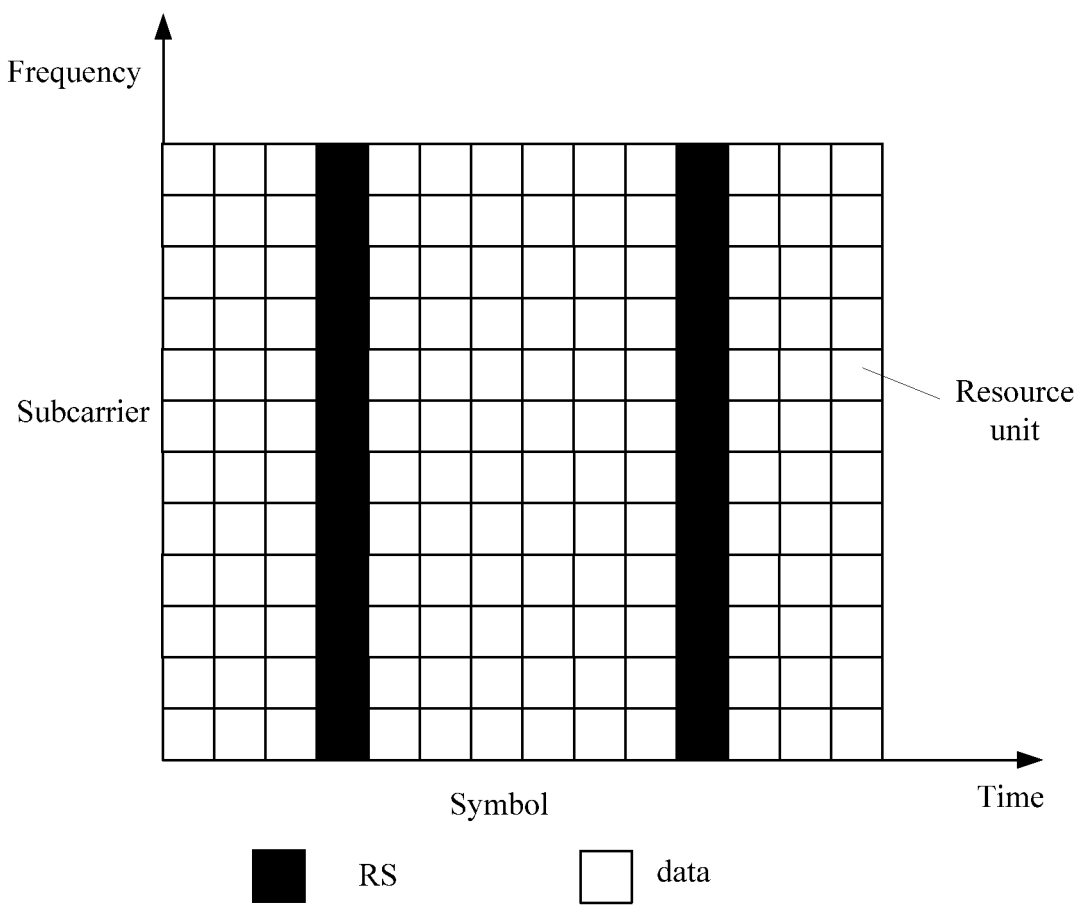
FIG. 2A is a schematic diagram that represents configuration of a resource used to bear a reference signal according to an embodiment of the present invention.

The following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems, such as a Global System for Mobile Communications (GSM), a Code Division Multiple Access (CDMA) system, a Wideband Code Division Multiple Access (WCDMA), a general packet radio service (GPRS), a Long Term Evolution (LTE), and a Long Term Evolution-Advanced (LTE-A).

A UE, also referred to as a mobile terminal, a mobile user equipment, a terminal device, and the like, may communicate with one or more core networks through a radio access network (RAN). The user equipment may be a mobile terminal, such as a mobile phone (also referred to as a "cellular" phone) and a computer with a mobile terminal. For example, the user equipment may be a portable, pocket-sized, handheld, computer built-in, or in-vehicle mobile apparatus, which exchanges language and/or data with the radio access network. In the embodiments of the present invention, a user equipment refers to a user equipment that can perform D2D communication.

A base station device may be a base station (BTS) in GSM or CDMA, or may be a base station (Node B) in WCDMA, may be an evolved NodeB in LTE, or may be a home evolutional Node B (HeNB or He-NodeB) which is not limited in the present invention. However, for ease of description, the following embodiments are described using a Node B as an example.

FIG. 1 shows a schematic flowchart of a method 100, which is described from a perspective of a user equipment, for transmitting a reference signal in D2D communication according to an embodiment of the present invention. In this embodiment of the present invention, two user equipments that perform D2D communication are called a first user equipment and a second user equipment; in this embodiment, methods for transmitting a reference signal by the two user equipments are the same or corresponding to each other. Therefore, for ease of understanding and no loss of generality, the following uses an action of the first user equipment as an example to describe an action at a user equipment side. It should be understood that, the foregoing listed first user equipment may be an initiating end of D2D communication, or may be a receiving end of D2D communication, that is, the first user equipment may be any one of the two user equipments that perform D2D communication, which is not specifically limited in the present invention.

As shown in FIG. 1, the method 100 includes the following steps.

S110: The first user equipment determines, in a communication resource for D2D communication, a target resource used to bear a RS, where the target resource is according to characteristic information used in selecting the target resource, and the characteristic information used in selecting the target resource includes at least one of the following two items: characteristic information used to uniquely identify the first user equipment, and characteristic information used to uniquely identify the second user equipment that performs D2D communication with the first user equipment.

S120: The first user equipment transmits the RS to the second user equipment using the target resource.

In this embodiment of the present invention, a basis (the characteristic information of the first user equipment and/or the characteristic information of the second user equipment) for determining a target resource used to bear an RS may be stipulated in advance, as an example rather than limitation, it may be stipulated that a user equipment may determine, according to characteristic information of an initiating end and/or a receiving end of D2D communication, the target resource from the resource (including a time domain resource, a frequency domain resource, a space domain resource, or a code domain resource) for D2D communication; or a user equipment may determine, according to first characteristic information (characteristic information of an initiating end and/or a receiving end of D2D communication), a first target resource, such as the time domain resource, from the resource (including a time domain resource, a frequency domain resource, a space domain resource, or a code domain resource) for D2D communication, and the user equipment determines, according to second characteristic information (characteristic information of an initiating end and/or a receiving end of D2D communication), a second target resource, such as the frequency domain resource, from the resource (including the time domain resource, the frequency domain resource, the space domain resource, or the code domain resource) for D2D communication. In this way, the user equipment may determine a target resource according to the stipulation using the basis (the characteristic information of the first user equipment and/or the characteristic information of the second user equipment) corresponding to the stipulation. It should be understood that, the foregoing described first characteristic information and second characteristic information may be the same, or may be different, which is not specifically limited in the present invention. For example, for a time domain resource, if two symbols in a subframe are used to bear an RS, characteristic information used to determine a first symbol and characteristic information used to determine a second symbol may be the same, or may be different, which is not specifically limited in the present invention.

It should be noted that, the characteristic information is information (which may be, for example, a user identity (UE ID) of a user equipment, or a radio network temporary identity (RNTI) of the user equipment in a communications system) that uniquely indicates the user equipment in the communications system, and the characteristic information can be obtained by a peer user equipment (for example, a user equipment may acquire characteristic information of a peer device during establishment of D2D communication). Description of a same or similar case is omitted in the following.

A resource used to bear a reference signal is determined according to characteristic information of a user equipment, so that the resource used to bear the reference signal is not limited to a fixed confined range, so that transmission of a reference signal between each terminal pair can still be ensured even in a case in which the number of terminal pairs that perform D2D communication is relatively large.

It should be understood that, the foregoing listed method for determining the target resource, and the parameters used in the method are merely for illustrative description, and the present invention is not limited thereto. Description of a same or similar case is omitted in the following.

In this embodiment of the present invention, the first user equipment may independently select the target resource from the resource (including the time domain resource, the frequency domain resource, the space domain resource, or the code domain resource) for D2D communication, and notify the second user equipment, and this corresponds to case 1. Or, the second user equipment may independently select the target resource from the resource (including the time domain resource, the frequency domain resource, the space domain resource, or the code domain resource) for D2D communication, so that the first user equipment may determine the target resource according to notification from the second user equipment, and this corresponds to case 2. Or, a base station device may independently select the target resource from the resource (including the time domain resource, the frequency domain resource, the space domain resource, or the code domain resource) for D2D communication, so that the first user equipment and the second user equipment may determine the target resource according to notification from the base station device, and this corresponds to case 3. The following separately describes the foregoing listed three cases.

Case 1

In this embodiment of the present invention, that the first user equipment determines, in the communication resource for D2D communication, the target resource used to bear the RS includes selecting, by the first user equipment, the target resource from the communication resource according to the characteristic information used in selecting the target resource; and before the first user equipment transmits the RS to the second user equipment using the target resource, the method further includes sending first information to the second user equipment, where the first information is used to indicate the characteristic information used in selecting the target resource by the first user equipment, so that the second user equipment determines the target resource according to the first information; or sending second information to the second user equipment, where the second information is used to indicate the target resource, so that the second user equipment determines the target resource according to the second information.

To be specific, when the target resource is only one of the time domain resource, the frequency domain resource, the space domain resource, or the code domain resource, or when the target resource includes at least two of the time domain resource, the frequency domain resource, the space domain resource, or the code domain resource, and the at least two resources are both based on same characteristic information (such as characteristic information of a same user equipment or characteristic information of the two user equipments), the first user equipment may select, according to the characteristic information of the first user equipment and/or the characteristic information of the second user equipment, the target resource from the resource for the D2D communication, or in other words, determine a mapping relationship between the characteristic information and the target resource.

Figure 2B:
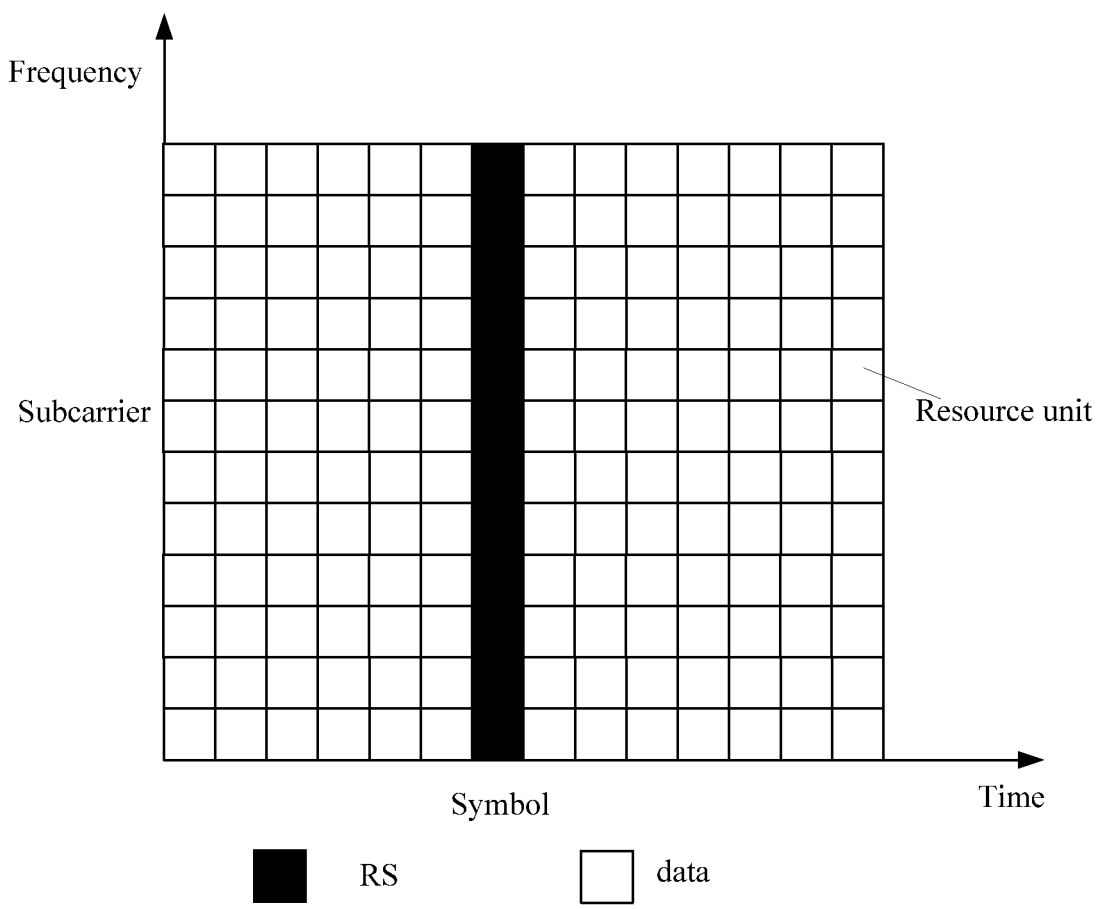
FIG. 2B is a schematic diagram that represents another configuration of a resource used to bear a reference signal according to an embodiment of the present invention.
Figure 2C:
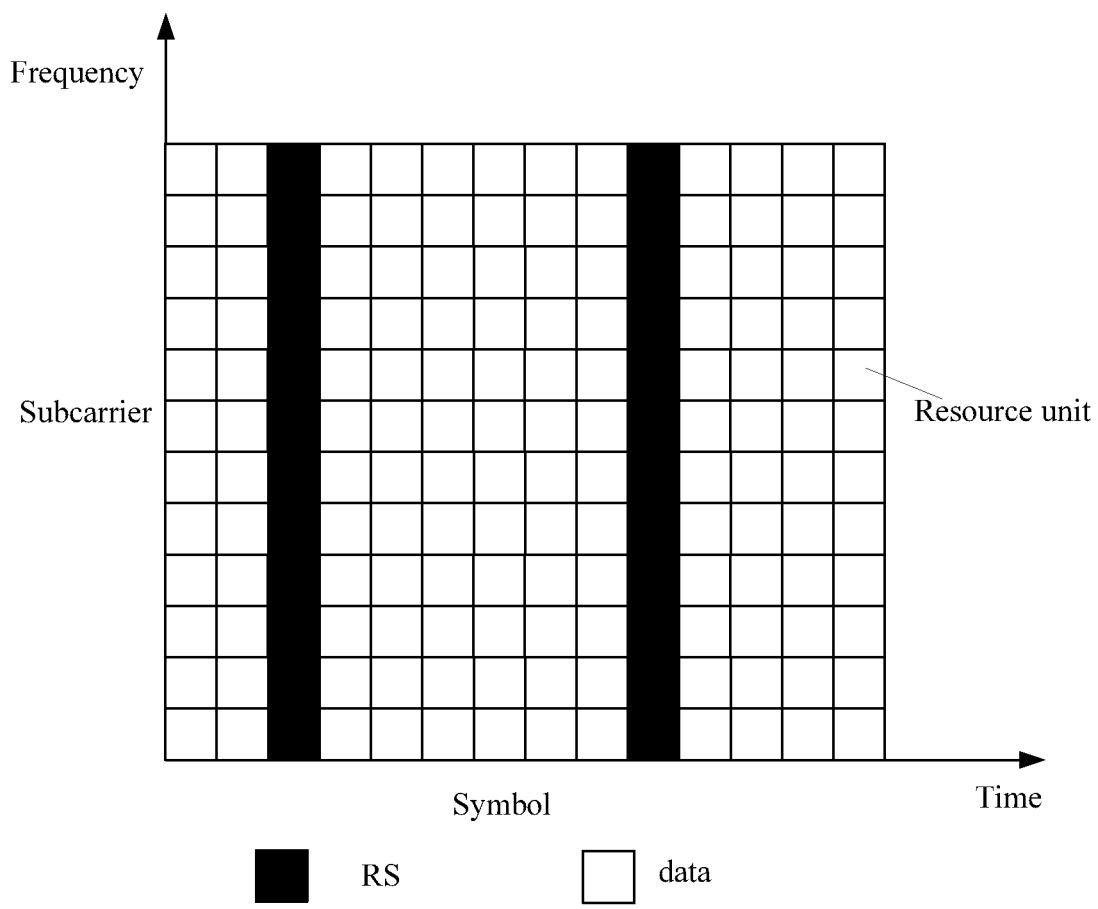
FIG. 2C is a schematic diagram that represents still another configuration of a resource used to bear a reference signal according to an embodiment of the present invention.

For example, when single carrier frequency division multiple access (SC-FDMA) is used as an uplink multiple-access scheme, in order to maintain a single-carrier characteristic, all subcarriers (frequency domain resources) in a symbol can bear only a reference signal or data. In this way, the reference signal needs to occupy at least one symbol, which cannot be refined to a level of a resource element (RE). Therefore, in this case, selection of a frequency domain resource may not be considered. For example, a target resource where a subframe has only one symbol may be designed, as shown in FIG. 2B; all modulation is based on an extrapolation method, or an interpolation method may also be considered when there is an RS that can be borrowed in a neighboring subframe. Or, a target resource where a subframe has two symbols may be designed, as shown in FIG. 2A and FIG. 2C. When a channel is in a poor condition, more than two symbols may be used to send an RS, which is not specifically limited in the present invention. In this embodiment of the present invention, no matter if one symbol, two symbols, or more symbols are used to send an RS, a resource (including the time domain resource, the frequency domain resource, the space domain resource, or the code domain resource) that sends the RS is not fixed, and a user equipment or a base station may select, from a D2D target resource according to characteristic information of the user equipment, a resource used to bear the RS.

a. Optionally, in this embodiment of the present invention, that the first user equipment selects the target resource from the communication resource according to the characteristic information used in selecting the target resource includes selecting, by the first user equipment, a target pattern from at least two preset patterns according to the characteristic information used in selecting the target resource, where each pattern is used to indicate a resource that is in the communication resource and used to bear an RS; and using a resource indicated by the target pattern and used to bear an RS as the target resource, where the second information is used to indicate the target pattern.

To be specific, multiple (such as eight) patterns may be set in advance, where the pattern indicates one or more symbols (an example of the target resource) used to bear an RS (such as a demodulation reference signal), in a subframe (a resource for D2D communication). FIG. 2A shows a pattern, FIG. 2B shows another pattern, and FIG. 2C shows still another pattern. The first user equipment may determine, according to characteristic information of a user equipment (the characteristic information of the first user equipment, or the characteristic information of the second user equipment, or the characteristic information of the first user equipment and the characteristic information of the second user equipment), a pattern used in current D2D communication. For example, a modulus operation may be performed on the total number of preset patterns using the characteristic information, to determine a digit (which, for example, may be represented using three bits), and the digit may be used to indicate a sequence number of the pattern, which is used in the current D2D communication, in the preset multiple (such as eight) patterns, so that the pattern used in the current D2D communication can be determined.

Therefore, the first user equipment may send the sequence number of the selected pattern in all the patterns to the second user equipment; and the second user equipment can determine, according to the sequence number, the pattern selected by the first user equipment, and use a target resource indicated by the pattern to bear an RS.

It should be noted herein that, when the characteristic information is a numerical value, the characteristic information may be directly used to determine a target resource (such as a sequence number of a pattern); when the characteristic information is expressed in another manner (such as a letter), an characteristic parameter (denoted by S) corresponding to the characteristic information may be further determined using a preset algorithm (a function, a formula, or the like), for example, any formula of the following formulas 1 to 3 may be used to determine the characteristic parameter S:

$$S_1 = f(X_1) \qquad \text{formula 1}$$

$$S_2 = f(X_1) \qquad \text{formula 2}$$

$$S_3 = f(X_1, X_2) \qquad \text{formula 3}$$

where $X_1$ represents the characteristic information of the first user equipment, $X_2$ represents the characteristic information of the second user equipment, and $f(\ )$ represents a mapping relationship between characteristic information and a characteristic parameter. In this embodiment of the present invention, the mapping relationship between the characteristic information and the characteristic parameter may be linear, or may be nonlinear, which is not specifically limited in the present invention. Therefore, the characteristic parameter may be used to replace the characteristic information for calculation in the foregoing process. In this embodiment of the present invention, the characteristic parameter S may uniquely correspond to one user equipment or a pair of user equipments. Description of a same or similar case is omitted in the following. For ease of description, in the following descriptions, the characteristic parameter S is considered as a basis for selecting (or determining) a target resource.

b. Optionally, in this embodiment of the present invention, that the first user equipment selects the target resource from the communication resource according to the characteristic information used in selecting the target resource includes determining, by the first user equipment, a deviation value according to the characteristic information used in selecting the target resource, where the deviation value is used to indicate a deviation, in a preset pattern, of the target resource relative to a preset resource used to bear an RS; and determining the target resource according to the deviation value and the pattern, where the second information is used to indicate the deviation value.

To be specific, a default pattern may be stipulated. For example, the pattern shown in FIG. 2A may be selected as the default pattern, and the characteristic parameter S is considered as a corresponding time domain shift. For example, S=2 represents that a symbol determined after a symbol, which is in the default pattern and used to bear an RS, moves rightwards for two units is the symbol (an example of the target resource) used to bear an RS in current D2D communication. In addition, if a numerical value of the characteristic parameter S exceeds the number of symbols in a subframe, a modulus operation is performed on the number of symbols in a subframe using the numerical value of the characteristic parameter S.

Therefore, the first user equipment may send the determined deviation value to the second user equipment, and the second user equipment may determine, from a preset pattern according to the deviation value, the target resource used to bear the RS.

c. Optionally, in this embodiment of the present invention, that the first user equipment selects the target resource from the communication resource according to the characteristic information used in selecting the target resource includes determining, by the first user equipment, a configured value according to the characteristic information used in selecting the target resource, where the configured value is used to indicate a location of the target resource in a preset pattern; and determining the target resource according to the configured value and the pattern, where the second information is used to indicate the configured value.

To be specific, a characteristic parameter S may be used to indicate one or more symbols in a time domain resource. For example, the characteristic parameter S is used to indicate a sequence number of a symbol in all symbols, so that the symbol may be determined, and the symbol is used to bear an RS. In addition, if a numerical value of the characteristic parameter S exceeds the number of symbols, a modulus operation is performed on the number of symbols using the numerical value of the characteristic parameter S, and the sequence number of the symbol in all the symbols is determined according to the modulus value.

Therefore, the first user equipment may send the determined configured value to the second user equipment, and the second user equipment may determine, from a preset pattern according to the configured value, the target resource used to bear the RS.

Figure 3A:
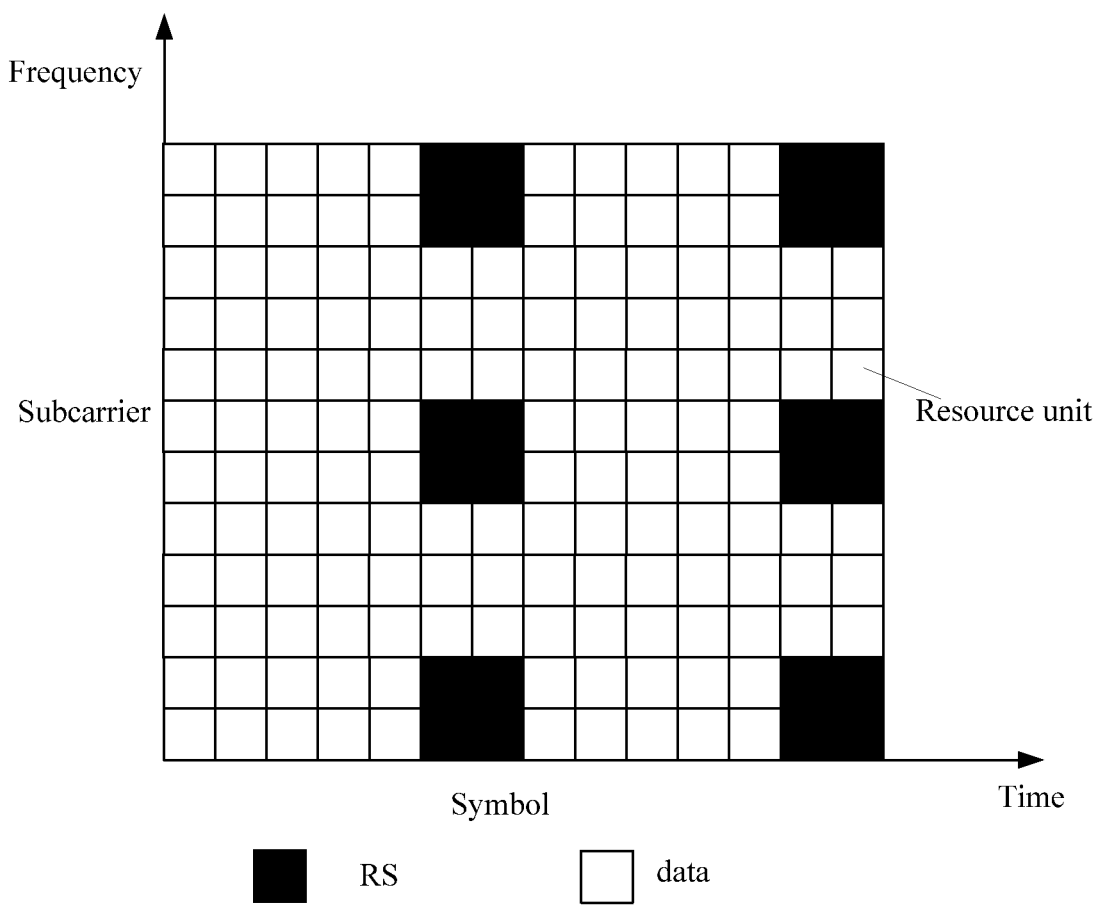
FIG. 3A is a schematic diagram that represents configuration of a resource used to bear a reference signal according to another embodiment of the present invention.

For another example, when orthogonal frequency division multiple access (OFDMA) is used as an uplink multiple-access scheme, as shown in FIG. 3A, it is allowed that two ports (space domain resource) use one RE, where a same sequence is used, and different orthogonal cover codes (OCC) are used for differentiation; and sequences of different cells are orthogonal. One sequence is used on a symbol, and the sequence itself may allow 12 cyclic shifts (CS). Therefore, a pattern with two or four ports may be directly used (as shown in FIG. 3A). In this case, a user equipment or a base station may select, from a D2D target resource according to characteristic information (or a characteristic parameter) of a user equipment, a resource used to bear an RS, where the resource includes a time domain resource (symbol), a frequency domain resource (subcarrier), and the like.

Figure 3B:
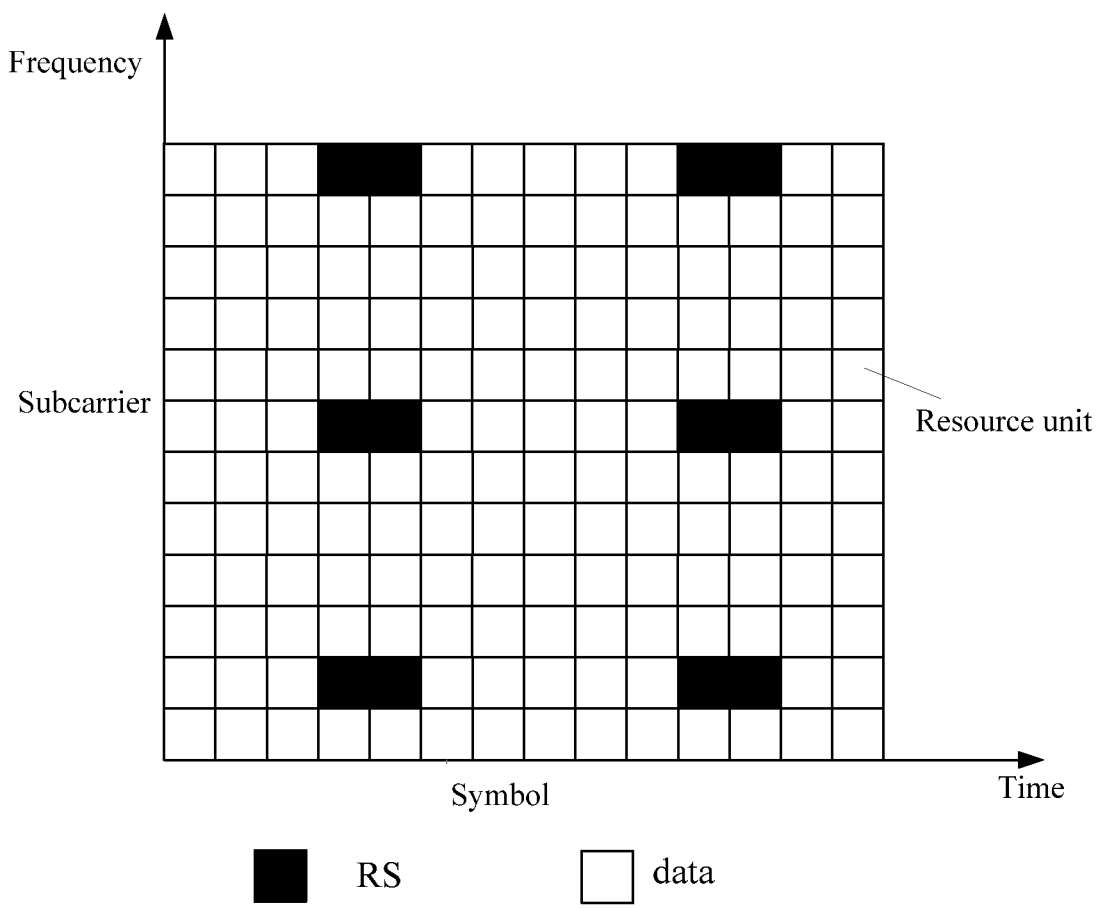
FIG. 3B is a schematic diagram that represents configuration of a resource used to bear a reference signal according to still another embodiment of the present invention.
Figure 3C:
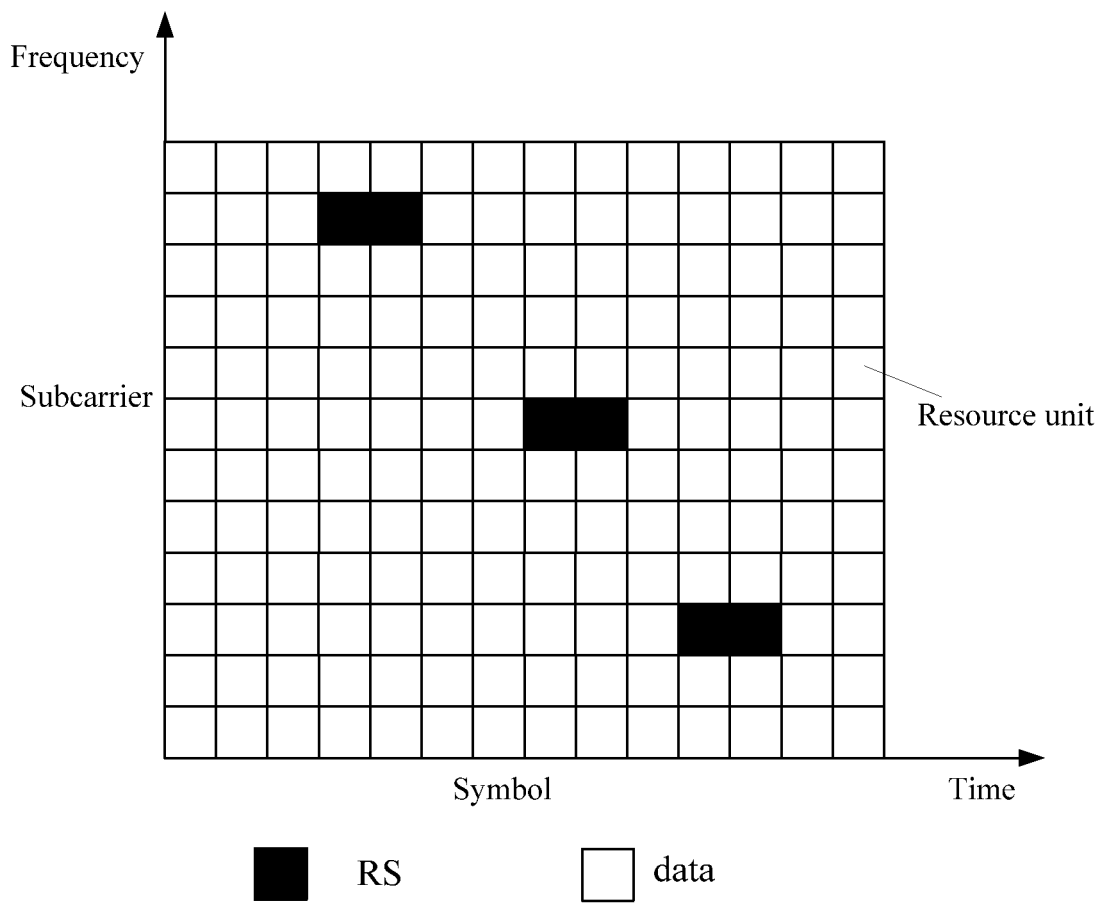
FIG. 3C is a schematic diagram that represents configuration of a resource used to bear a reference signal according to still another embodiment of the present invention.

In addition, in this embodiment of the present invention, considering that a communication distance is relatively short in D2D communication, and relatively speaking, a channel change is not too radical; as a result, a relatively small number of REs may be used to bear an RS (as shown in FIG. 3B or FIG. 3C). Therefore, multiple subsets may be extracted from the pattern with two ports or four ports, and then different UE pairs are made to use different subsets. In this case, a user equipment or a base station may select, from the D2D target resource according to characteristic information (or a characteristic parameter) of a user equipment, a resource used to bear an RS, where the resource includes a time domain resource (symbol), a frequency domain resource (subcarrier), a space domain resource (port), and the like.

d. Multiple patterns may be set in advance, where the pattern indicates a symbol (an example of a first target resource) that is in a subframe and carries an RS and/or a subcarrier (an example of a second target resource). For example, FIG. 3B shows a pattern, and FIG. 3C shows a pattern. In addition, a pattern to be used is determined according to a characteristic parameter S. For example, the pattern to be used may be determined by performing a modulus operation on a total number of patterns using the characteristic parameter S, and if multiple symbols (an example of a target resource) are used to bear an RS, resources corresponding to the multiple symbols may be not fixed, that is, different symbols may be separately selected according to different characteristic parameters S (for example, one symbol is selected according to $S_1$, and another symbol is selected according to $S_2$).

e. One pattern may be selected as a default pattern (for example, as shown in FIG. 3A, FIG. 3B, or FIG. 3C), and a parameter S is considered as a corresponding time domain shift/frequency domain shift/space domain shift/code domain shift, for example, S=2 represents that a symbol determined after a symbol, which is in the default pattern and used to bear an RS, moves rightwards for two units is the symbol (an example of a target resource) used to bear an RS in current D2D communication. In addition, if a numerical value of the parameter S exceeds the number of symbols in a subframe, a modulus operation is performed on the number of symbols in a subframe using the numerical value of the parameter S. Likewise, the parameter S may also be used to indicate a subcarrier (frequency domain resource), an antenna port (space domain resource), an RS sequence, an OCC, or a CS.

f. A characteristic parameter S may be used to indicate one or more symbols in a time domain frequency, such as a sequence number of a symbol in all symbols, and the symbol is used to bear an RS. In addition, if a numerical value of the characteristic parameter S exceeds the number of symbols, a modulus operation is performed on the number of symbols using the numerical value of the characteristic parameter S, and the sequence number of the symbol in all the symbols is determined according to the modulus value. Likewise, the parameter S may also be used to indicate a subcarrier (frequency domain resource), an antenna port (space domain resource), an RS sequence, an OCC, or a CS.

Therefore, in the method for transmitting a reference signal according to this embodiment of the present invention, an overhead of a reference signal can be effectively reduced.

It should be understood that the foregoing listed methods for selecting a target resource (determining a mapping relationship between characteristic information and a target resource) are merely for illustrative description, and the present invention is not limited thereto.

It should be noted that, in this embodiment of the present invention, if multiple resources (such as symbols for bearing an RS) are used to bear an RS (for example, two or more symbols in a subframe are used to bear an RS), relative locations of the multiple resources may be fixed, that is, a same shift (such as a time domain shift) may be obtained by means of calculation according to same characteristic information. Or, relative locations of the multiple resources may be not fixed, that is, different time domain shifts may be obtained by means of calculation according to different characteristic parameters S, so as to select different resources (for example, one symbol is selected according to $S_1$, and another symbol is selected according to $S_2$).

In this embodiment of the present invention, if the target resource is at least two of the time domain resource, the frequency domain resource, the space domain resource, or the code domain resource, and the at least two resources are determined according to different characteristic information, the first user equipment may select, from the resource for the D2D communication, a first target resource according to the characteristic information of the first user equipment, or in other words, determine a mapping relationship between the characteristic information of the first user equipment and the first target resource. In addition, the first user equipment may select, according to the characteristic information of the second user equipment, a second target resource from the resource for the D2D communication, or in other words, determine a mapping relationship between the characteristic information of the second user equipment and the second target resource. It should be noted herein that, in this embodiment of the present invention, the first target resource and the second target resource are different resources, but specific types of the first target resource and the second target resource are not limited, that is, the first target resource may be one or more of the time domain resource, the frequency domain resource, the space domain resource, or the code domain resource, and the second target resource may be a resource, which is different from the first target resource, in the time domain resource, the frequency domain resource, the space domain resource, or the code domain resource.

Optionally, in this embodiment of the present invention, the target resource includes at least two of the time domain resource, the frequency domain resource, the space domain resource, or the code domain resource, where the determining, by the first user equipment, in a communication resource, a target resource used to bear a RS includes selecting, by the first user equipment, a first target resource according to the characteristic information of the first user equipment and/or the characteristic information of the second user equipment; and selecting a second target resource according to the characteristic information of the first user equipment and/or the characteristic information of the second user equipment.

Processes herein in which the first user equipment determines and selects a first pattern according to the characteristic information of the first user equipment and/or the characteristic information of the second user equipment, and the first user equipment determines and selects a second pattern according to the characteristic information of the first user equipment and/or the characteristic information of the second user equipment are similar to processes in methods a to f; and descriptions of the processes are omitted herein to avoid repeated description.

Optionally, in this embodiment of the present invention, a method for the second user equipment to determine a target resource may be the same as the method for the first user equipment to select a target resource. Therefore, in this case, the first user equipment needs to notify the second user equipment of whether the target resource is determined according to the characteristic information of the first user equipment or determined according to the characteristic information of the second user equipment, so as to ensure that the second user equipment can accurately determine the target resource. In this embodiment of the present invention, a process in which the second user equipment determines a target resource according to characteristic information is similar to a process in which the second user equipment selects a target resource according to characteristic information; and descriptions of the process are omitted herein to avoid repeated description.

Optionally, in this embodiment of the present invention, after selecting the target resource, the first user equipment may further directly send information (second information, such as a sequence number, in a subframe, of a symbol that carries an RS, a sequence number of a pattern, or a deviation value of the target resource), which indicates the target resource, to the second user equipment, so that the second user equipment may determine the target resource according to the information that indicates the target resource.

Case 2

The target resource is selected from the communication resource by the second user equipment according to characteristic information used in selecting the target resource; and that the first user equipment determines, in a communication resource for D2D communication, a target resource used to bear an RS includes receiving, by the first user equipment, third information sent by the second user equipment, where the third information is used to indicate the characteristic information used in selecting the target resource by the second user equipment, and determining the target resource according to the third information; or receiving, by the first user equipment, fourth information sent by the second user equipment, where the fourth information is used to indicate the target resource, and determining the target resource according to the fourth information.

To be specific, in this embodiment of the present invention, when the target resource is only one of the time domain resource, the frequency domain resource, the space domain resource, or the code domain resource, or when the target resource includes at least two of the time domain resource, the frequency domain resource, the space domain resource, or the code domain resource, and the at least two resources are both determined according to characteristic information of a same user equipment, the second user equipment may select, according to the characteristic information of the first user equipment and/or the characteristic information of the second user equipment, the target resource from the resource for the D2D communication, or in other words, determine a mapping relationship between the characteristic information and the target resource.

When the target resource includes at least two of the time domain resource, the frequency domain resource, the space domain resource, or the code domain resource, and the at least two resources are respectively determined according to characteristic information of different user equipments, the second user equipment may select, according to the characteristic information of the first user equipment, a first target resource from the resource for the D2D communication, or in other words, determine a mapping relationship between the characteristic information of the first user equipment and the first target resource. In addition, the first user equipment may select, according to the characteristic information of the second user equipment, a second target resource from the resource for the D2D communication, or in other words, determine a mapping relationship between the characteristic information of the second user equipment and the second target resource. It should be noted herein that, in this embodiment of the present invention, the first target resource and the second target resource are different resources, but specific types of the first target resource and the second target resource are not limited, that is, the first target resource may be one or more of the time domain resource, the frequency domain resource, the space domain resource, or the code domain resource, and the second target resource may be a resource, which is different from the first target resource, in the time domain resource, the frequency domain resource, the space domain resource, or the code domain resource.

In this embodiment of the present invention, a method and a process for the second user equipment to select a target resource is the same as a method and a process for the first user equipment to select a target resource; and descriptions of the method and the process are omitted herein to avoid repeated description.

Optionally, in this embodiment of the present invention, a method for the first user equipment to determine a target resource may be the same as the method for the second user equipment to select a target resource. Therefore, in this case, the second user equipment needs to notify the first user equipment of whether the target resource is determined according to the characteristic information of the first user equipment or determined according to the characteristic information of the second user equipment, so as to ensure that the first user equipment can accurately determine the target resource. In this embodiment of the present invention, a process in which the second user equipment determines a target resource according to characteristic information is similar to a process in which the first user equipment selects a target resource according to characteristic information, and descriptions of the process are omitted herein to avoid repeated description.

Optionally, in this embodiment of the present invention, after selecting the target resource, the second user equipment may further directly send information (such as a location of the target resource in the communication resource, a selected pattern, or a deviation value of the target resource), which indicates the target resource, to the first user equipment, so that the first user equipment may determine the target resource according to the information that indicates the target resource.

To be specific, multiple patterns may be set in advance, where the pattern indicates a symbol (an example of a first target resource) that is in a subframe and carries an RS and/or a subcarrier (an example of a second target resource); and the first user equipment determines a pattern to be used according to fourth information notified of by the second user equipment. For example, the fourth information is 2, which indicates that the pattern numbered 2 is used in current D2D communication. Alternatively, one pattern may be selected as a default pattern, and the fourth information indicates a time domain shift/frequency domain shift/space domain shift/code domain shift. For example, the fourth information indicates that 2 represents that a symbol determined after a symbol, which is in the default pattern and used to bear an RS, moves rightwards for two units is the symbol (an example of the target resource) used to bear an RS in current D2D communication.

Alternatively, for example, the fourth information indicates one or more symbols, such as a sequence number of a symbol in all symbols, and the symbol is used to bear an RS.

Case 3

The target resource is selected from a communication resource by a base station device according to characteristic information used in selecting the target resource; and that the first user equipment determines the target resource includes receiving, by the first user equipment, fifth information sent by the base station device, where the fifth information is used to indicate the characteristic information used in selecting the target resource by the base station device; and determining the target resource according to the fifth information; or receiving, by the first user equipment, sixth information sent by the base station device, where the sixth information is used to indicate the target resource; and determining the target resource according to the sixth information.

Optionally, the target resource includes at least one of the time domain resource, the frequency domain resource, the space domain resource, and the code domain resource.

To be specific, in this embodiment of the present invention, when the target resource is only one of the time domain resource, the frequency domain resource, the space domain resource, or the code domain resource, or when the target resource includes at least two of the time domain resource, the frequency domain resource, the space domain resource, or the code domain resource, and the at least two resources are both determined according to characteristic information of a same user equipment, the base station device may select, according to the characteristic information of the first user equipment and/or the characteristic information of the second user equipment, the target resource from the resource for the D2D communication, or in other words, determine a mapping relationship between the characteristic information and the target resource.

Alternatively, when the target resource includes at least two of the time domain resource, the frequency domain resource, the space domain resource, or the code domain resource, and the at least two resources are respectively determined according to characteristic information of different user equipments, the base station device may select, according to the characteristic information of the first user equipment, a first target resource from the resource for the D2D communication, or in other words, determine a mapping relationship between the characteristic information of the first user equipment and the first target resource. In addition, the first user equipment may select, according to the characteristic information of the second user equipment, a second target resource from the resource for the D2D communication, or in other words, determine a mapping relationship between the characteristic information of the second user equipment and the second target resource. It should be noted herein that, in this embodiment of the present invention, the first target resource and the second target resource are different resources, but specific types of the first target resource and the second target resource are not limited, that is, the first target resource may be one or more of the time domain resource, the frequency domain resource, the space domain resource, or the code domain resource, and the second target resource may be a resource, which is different from the first target resource, in the time domain resource, the frequency domain resource, the space domain resource, or the code domain resource.

In this embodiment of the present invention, a method and a process for the base station device to select a target resource is the same as a method and a process for the first user equipment to select a target resource; and descriptions of the method and the process are omitted herein to avoid repeated description.

Optionally, in this embodiment of the present invention, a method for the first user equipment to determine a target resource is the same as the method for the base station device to select a target resource. Therefore, in this case, the base station device needs to notify the first user equipment of whether the target resource is determined according to the characteristic information of the first user equipment or determined according to the characteristic information of the second user equipment, so as to ensure that the first user equipment can accurately determine the target resource. In this embodiment of the present invention, a process in which the second user equipment determines a target resource according to characteristic information is similar to a process in which the first user equipment selects a target resource according to characteristic information; and descriptions of the process are omitted herein to avoid repeated description.

Optionally, in this embodiment of the present invention, after selecting the target resource, the base station device may further directly send information (such as a location of the target resource in the communication resource, a selected pattern, or a deviation value of the target resource), which indicates the target resource, to the first user equipment, so that the first user equipment may determine the target resource according to the information that indicates the target resource.

To be specific, multiple patterns may be set in advance, where the pattern indicates a symbol (an example of a first target resource) that is in a subframe and carries an RS and/or a subcarrier (an example of a second target resource); and the first user equipment determines a pattern to be used according to fourth information notified of by the second user equipment. For example, the fourth information is 2, which indicates that the pattern numbered 2 is used in current D2D communication.

Alternatively, one pattern may be selected as a default pattern, and the fourth information indicates a time domain shift/frequency domain shift/space domain shift/code domain shift. For example, the fourth information indicates that 2 represents that a symbol determined after a symbol, which is in the default pattern and used to bear an RS, moves rightwards for two units is the symbol (an example of the target resource) used to bear an RS in current D2D communication.

Alternatively, for example, the fourth information indicates one or more symbols, such as a sequence number of a symbol in all symbols, and the symbol is used to bear an RS.

In the method for transmitting a reference signal according to this embodiment of the present invention, a target resource used to bear a reference signal is determined according to characteristic information of a user equipment that performs D2D communication, which can implement dynamic configuration of a resource, so that transmission of a reference signal between each terminal pair can still be ensured even in a case in which the number of terminal pairs that perform D2D communication is relatively large.

FIG. 4 shows a schematic flowchart of a method 200, which is described from a perspective of a base station device, for transmitting a reference signal in D2D communication according to an embodiment of the present invention. As shown in FIG. 4, the method 200 includes the following steps.

S210. Acquire characteristic information used in selecting a target resource, where the characteristic information used in selecting the target resource includes at least one of the following two items: characteristic information used to uniquely identify the first user equipment, and characteristic information used to uniquely identify a second user equipment that performs D2D communication with the first user equipment.

S220. Select, from a communication resource for the D2D communication according to the characteristic information used in selecting the target resource, the target resource used to bear a RS.

S230. Send fifth information to at least one user equipment of the first user equipment and the second user equipment, where the fifth information is used to indicate the characteristic information used in selecting the target resource, so that the at least one user equipment determines, according to the fifth information, the target resource used to bear the RS; or send sixth indication information to the at least one user equipment, where the sixth information is used to indicate the target resource, so that the at least one user equipment determines, according to the sixth information, the target resource used to bear the RS.

To be specific, the base station device may acquire characteristic information of a user equipment that performs D2D communication. It should be noted that, when the characteristic information is a numerical value, the characteristic information may be directly used to determine the target resource, such as a sequence number of a pattern, used to bear the RS (which is referred to as the target resource for short in the following). When the characteristic information is expressed in another manner, a characteristic parameter (denoted by S) corresponding to the characteristic information may be further determined according to a preset algorithm (a function, a formula, or the like), for example, the characteristic parameter S may be determined using any formula of the foregoing formulas 1 to 3. In this embodiment of the present invention, a mapping relationship between the characteristic information and the characteristic parameter may be linear, or may be nonlinear, which is not specifically limited in the present invention. Therefore, the characteristic parameter may be used to replace the characteristic information for calculation in the foregoing process. In this embodiment of the present invention, the characteristic parameter S may uniquely correspond to one user equipment or a pair of user equipments. Description of a same or similar case is omitted in the following. For ease of description, in the following descriptions, the characteristic parameter S is considered as a basis for selecting (or determining) a target resource.

Optionally, in this embodiment of the present invention, a basis used in determining a target resource used to bear an RS may be stipulated. As an example but rather than limitation, it may be stipulated that a user equipment determines, according to characteristic information (or a determined characteristic parameter corresponding to the characteristic information) of an initiating end and (or a receiving end) of D2D communication, the target resource from the resource (including a time domain resource, a frequency domain resource, a space domain resource, or a code domain resource) for D2D communication. Or, it may be stipulated that a user equipment determines, from the resource (including the time domain resource, the frequency domain resource, the space domain resource, or the code domain resource) for D2D communication according to characteristic information of an initiating end of D2D communication, the first target resource, such as the time domain resource, used to bear a reference signal; and it is stipulated that the user equipment determines, from the resource (including the time domain resource, the frequency domain resource, the space domain resource, or the code domain resource) for D2D communication according to the characteristic information of the initiating end of D2D communication, the second target resource, such as the frequency domain resource, used to bear a reference signal. In this way, the base station device may determine, according to the foregoing stipulation, a target resource using the basis corresponding to the stipulation.

A resource used to bear a reference signal is determined according to characteristic information of a user equipment, so that the resource used to bear the reference signal is not limited to a fixed confined range, so that transmission of a reference signal between each terminal pair can still be ensured even in a case in which the number of terminal pairs that perform D2D communication is relatively large.

It should be understood that, the foregoing listed method for determining the target resource, and the parameters used in the method are merely for illustrative description, and the present invention is not limited thereto. Description of a same or similar case is omitted in the following.

In this embodiment of the present invention, when the target resource is only one of the time domain resource, the frequency domain resource, the space domain resource, or the code domain resource, or when the target resource include at least two of the time domain resource, the frequency domain resource, the space domain resource, or the code domain resource, and the at least two resources are both based on same characteristic information (such as characteristic information of a same user equipment or characteristic information of the two user equipments), that the base station device determines the target resource used to bear the RS includes selecting, by the base station device, the target resource according to the characteristic information of the first user equipment and/or the characteristic information of the second user equipment.

The target resource includes at least one of the time domain resource, the frequency domain resource, the space domain resource, or the code domain resource for D2D communication.

To be specific, in this embodiment of the present invention, when the target resource is only one of the time domain resource, the frequency domain resource, the space domain resource, or the code domain resource, or when the target resource includes at least two of the time domain resource, the frequency domain resource, the space domain resource, or the code domain resource, and the at least two resources are both determined according to same characteristic information, the base station device may select, according to the characteristic information of the first user equipment and/or the characteristic information of the second user equipment, the target resource from the resource for the D2D communication, or in other words, determine a mapping relationship between the characteristic information and the target resource.

For example, when SC-FDMA is used as an uplink multiple-access scheme, in order to maintain a single-carrier characteristic, all subcarriers (frequency domain resources) in a symbol can bear only a reference signal or data. In this way, the reference signal needs to occupy at least one symbol, which cannot be refined to a level of a RE. Therefore, in this case, selection of a frequency domain resource may not be considered. For example, a target resource where a subframe has only one symbol may be designed, as shown in FIG. 2B; all modulation is based on an extrapolation method, or an interpolation method may also be considered when there is an RS that can be borrowed in a neighboring subframe. Or, a target resource where a subframe has two symbols may be designed may be designed, as shown in FIG. 2C. When a channel is in a poor condition, more than two symbols may be used to send an RS, which is not specifically limited in the present invention. In this embodiment of the present invention, no matter one symbol, two symbols, or more symbols are used to send an RS, a resource (including the time domain resource, the frequency domain resource, the space domain resource, or the code domain resource) that sends the RS is not fixed, and a user equipment or a base station may select, from a D2D target resource according to characteristic information of the user equipment, a resource used to bear the RS.

g. Optionally, in this embodiment of the present invention, the selecting, from the communication resource for the D2D communication according to the characteristic information used in selecting the target resource, the target resource used to bear an RS includes selecting a target pattern from at least two preset patterns according to the characteristic information used in selecting the target resource, where each pattern is used to indicate a resource that is in the communication resource and used to bear an RS; and using a resource indicated by the target pattern and used to bear an RS as the target resource, where the sixth information is used to indicate the target pattern.

To be specific, multiple (such as eight) patterns may be set in advance, where the pattern indicates one or more symbols (an example of the target resource) used to bear an RS (such as a demodulation reference signal), in a subframe (a resource for D2D communication). FIG. 2A shows a pattern, FIG. 2B shows another pattern, and FIG. 2C shows still another pattern. The base station device may determine, according to characteristic information of a user equipment (the characteristic information of the first user equipment, or the characteristic information of the second user equipment, or the characteristic information of the first user equipment and the characteristic information of the second user equipment), a pattern used in current D2D communication. For example, a modulus operation may be performed on the total number of preset patterns using the characteristic information, to determine a digit (which, for example, may be represented using three bits), and the digit may be used to indicate a sequence number of the pattern, which is used in the current D2D communication, in the preset multiple (such as eight) patterns, so that the pattern used in the current D2D communication can be determined.

It should be noted herein that, when the characteristic information is a numerical value, the characteristic information may be directly used to determine a target resource (such as a sequence number of a pattern); when the characteristic information is expressed in another manner (such as a letter), an characteristic parameter (denoted by S) corresponding to the characteristic information may be further determined using a preset algorithm (a function, a formula, or the like), for example, any formula of the foregoing formulas 1 to 3 may be used to determine the characteristic parameter S. In this embodiment of the present invention, a mapping relationship between the characteristic information and the characteristic parameter may be linear, or may be nonlinear, which is not specifically limited in the present invention. Therefore, the characteristic parameter may be used to replace the characteristic information for calculation in the foregoing process. In this embodiment of the present invention, the characteristic parameter S may uniquely correspond to one user equipment or a pair of user equipments.

h. The selecting, from a communication resource for the D2D communication according to the characteristic information used in selecting the target resource, the target resource used to bear a RS includes determining a deviation value according to the characteristic information used in selecting the target resource, where the deviation value is used to indicate a deviation, in a preset pattern, of the target resource relative to a preset resource used to bear an RS; and determining the target resource according to the deviation value and the pattern, where the sixth information is used to indicate the deviation value.

To be specific, a default pattern may be stipulated. For example, the pattern shown in FIG. 2A may be selected as the default pattern, and the characteristic parameter S is considered as a corresponding time domain shift. For example, S=2 represents that a symbol determined after a symbol, which is in the default pattern and used to bear an RS, moves rightwards for two units is the symbol (an example of the target resource) used to bear an RS in current D2D communication. In addition, if a numerical value of the characteristic parameter S exceeds the number of symbols in a subframe, a modulus operation is performed on the number of symbols in a subframe using the numerical value of the characteristic parameter S.

i. Optionally, in this embodiment of the present invention, the selecting, from the communication resource for the D2D communication according to the characteristic information used in selecting the target resource, the target resource used to bear an RS includes determining a configured value according to the characteristic information used in selecting the target resource, where the configured value is used to indicate a location of the target resource in a preset pattern; and determining the target resource according to the configured value and the pattern, where the sixth information is used to indicate the configured value.

To be specific, a characteristic parameter S may be used to indicate one or more symbols in a time domain resource. For example, the characteristic parameter S is used to indicate a sequence number of a symbol in all symbols, so that the symbol may be determined, and the symbol is used to bear an RS. In addition, if a numerical value of the characteristic parameter S exceeds the number of symbols, a modulus operation is performed on the number of symbols using the numerical value of the characteristic parameter S, and the sequence number of the symbol in all the symbols is determined according to the modulus value.

For another example, when OFDMA is used as an uplink multiple-access scheme, as shown in FIG. 3A, it is allowed that two ports (space domain resource) use one RE, where a same sequence is used, and different OCCs are for differentiation; and sequences of different cells are orthogonal. One sequence is used on a symbol, and the sequence itself may allow 12 CS. Therefore, a pattern with two or four ports may be directly used (as shown in FIG. 3A). In this case, a user equipment or a base station may select, from a D2D target resource according to characteristic information (or a characteristic parameter) of a user equipment, a resource used to bear an RS.

In addition, in this embodiment of the present invention, considering that a communication distance is relatively short in D2D communication, and relatively speaking, a channel change is not too radical; as a result, a relatively small number of REs may be used to bear an RS (as shown in FIG. 3B or FIG. 3C). Therefore, multiple subsets may be extracted from the pattern with two ports or four ports, and then different UE pairs are made to use different subsets. In this case, a user equipment or a base station may select, from a D2D target resource according to characteristic information (or a characteristic parameter) of a user equipment, a resource used to bear an RS.

j. Multiple patterns may be set in advance, where the pattern indicates a symbol (an example of a first target resource) that is in a subframe and carries an RS and/or a subcarrier (an example of a second target resource). For example, FIG. 3B is a pattern, and FIG. 3C is a pattern. In addition, a pattern to be used is determined according to a characteristic parameter S. For example, the pattern to be used may be determined by performing a modulus operation on a total number of patterns using the characteristic parameter S, and if multiple symbols (an example of a target resource) are used to bear an RS, resources corresponding to the multiple symbols may be not fixed, that is, different symbols may be separately selected according to different characteristic parameters S (for example, one symbol is selected according to $S_1$, and another symbol is selected according to $S_2$).

k. One pattern may be selected as a default pattern (for example, as shown in FIG. 3A, FIG. 3B, or FIG. 3C), and a parameter S is considered as a corresponding time domain shift/frequency domain shift/space domain shift/code domain shift, for example, S=2 represents that a symbol determined after a symbol, which is in the default pattern and used to bear an RS, moves rightwards for two units is the symbol (an example of a target resource) used to bear an RS in current D2D communication. In addition, if a numerical value of the parameter S exceeds the number of symbols in a subframe, a modulus operation is performed on the number of symbols in a subframe using the numerical value of the parameter S. Likewise, the parameter S may also be used to indicate a subcarrier (frequency domain resource), an antenna port (space domain resource), an RS sequence, an OCC, or a CS.

l. A characteristic parameter S may be used to indicate one or more symbols in a time domain frequency, such as a sequence number of a symbol in all symbols, and the symbol is used to bear an RS. In addition, if a numerical value of the characteristic parameter S exceeds the number of symbols, a modulus operation is performed on the number of symbols using the numerical value of the characteristic parameter S, and the sequence number of the symbol in all the symbols is determined according to the modulus value. Likewise, the parameter S may also be used to indicate a subcarrier (frequency domain resource), an antenna port (space domain resource), an RS sequence, an OCC, or a CS.

Therefore, in the method for transmitting a reference signal according to this embodiment of the present invention, an overhead of a reference signal can be effectively reduced.

It should be understood that the foregoing listed methods for selecting a target resource (determining a mapping relationship between characteristic information and a target resource) are merely for illustrative description, and the present invention is not limited thereto.

It should be noted that, in this embodiment of the present invention, if multiple resources (such as symbols for bearing an RS) are used to bear an RS (for example, two or more symbols in a subframe are used to bear an RS), relative locations of the multiple resources may be fixed, that is, a same shift (such as a time domain shift) may be obtained by means of calculation according to same characteristic information. Or, relative locations of the multiple resources may be not fixed, that is, different time domain shifts may be obtained by means of calculation according to different characteristic parameters S, so as to select different resources (for example, one symbol is selected according to $S_1$, and another symbol is selected according to $S_2$).

In this embodiment of the present invention, if the target resource is at least two of the following: the time domain resource, the frequency domain resource, the space domain resource, or the code domain resource; and the selecting, from the communication resource for D2D communication according to the characteristic information of the first user equipment and/or the characteristic information of the second user equipment, then the target resource used to bear an RS includes selecting a first target resource according to the characteristic information of the first user equipment and/or the characteristic information of the second user equipment; and selecting the second target resource according to the characteristic information of the first user equipment and/or the characteristic information of the second user equipment.

The target resource includes at least two of the time domain resource, the frequency domain resource, the space domain resource, or the code domain resource for D2D communication.

To be specific, in this embodiment of the present invention, when the target resource includes at least two of the time domain resource, the frequency domain resource, the space domain resource, or the code domain resource, and the at least two resources are respectively determined according to characteristic information of different user equipments, the base station device may select the first target resource from the resource for the D2D communication according to the characteristic information of the first user equipment, or in other words, determine a mapping relationship between the characteristic information of the first user equipment and the first target resource. In addition, the base station device may select, according to the characteristic information of the second user equipment, a second target resource from the resource for the D2D communication, or in other words, determine a mapping relationship between the characteristic information of the second user equipment and the second target resource. It should be noted herein that, in this embodiment of the present invention, the first target resource and the second target resource are different resources, but specific types of the first target resource and the second target resource are not limited, that is, the first target resource may be one or more of the time domain resource, the frequency domain resource, the space domain resource, or the code domain resource, and the second target resource may be a resource, which is different from the first target resource, in the time domain resource, the frequency domain resource, the space domain resource, or the code domain resource.

Processes herein in which the base station device determines and selects a first pattern according to the characteristic information of the first user equipment and/or the characteristic information of the second user equipment, and the base station device determines and selects a second pattern according to the characteristic information of the first user equipment and/or the characteristic information of the second user equipment are similar to processes in methods g to 1; and descriptions of the processes are omitted herein to avoid repeated description.

Optionally, in this embodiment of the present invention, a method for a user equipment to determine a target resource is the same as the method for the base station device to select a target resource. Therefore, in this case, the base station device needs to notify the first user equipment of whether the target resource is determined according to the characteristic information of the first user equipment or determined according to the characteristic information of the second user equipment, so as to ensure that the user equipment can accurately determine the target resource. In this embodiment of the present invention, a process in which a user equipment determines a target resource according to characteristic information is similar to a process in which the base station device selects a target resource according to characteristic information; and descriptions of the process are omitted herein to avoid repeated description.

Optionally, in this embodiment of the present invention, after selecting the target resource, the base station device may further directly send information (such as a sequence number, in a subframe, of a symbol that carries an RS), which indicates the target resource, to a user equipment, so that the user equipment may determine the target resource according to the information that indicates the target resource.

In the method for transmitting a reference signal according to this embodiment of the present invention, a target resource used to bear a reference signal is determined according to characteristic information of a user equipment that performs D2D communication, which can implement dynamic configuration of a resource, so that transmission of a reference signal between each terminal pair can still be ensured even in a case in which the number of terminal pairs that perform D2D communication is relatively large.

Figure 5:
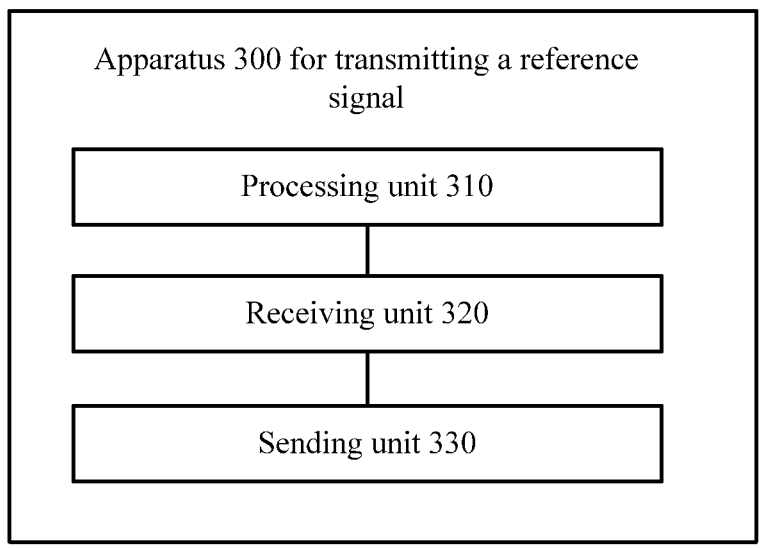
FIG. 5 is a schematic block diagram of an apparatus for transmitting a reference signal in D2D communication according to an embodiment of the present invention.
Figure 6:
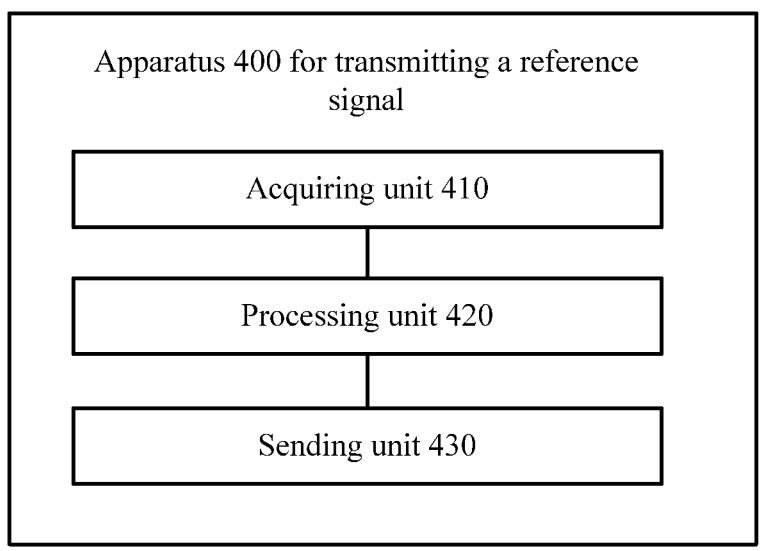
FIG. 6 is a schematic block diagram of an apparatus for transmitting a reference signal in D2D communication according to another embodiment of the present invention.

The foregoing describes in detail, with reference to FIG. 1 to FIG. 4, the method for transmitting a reference signal according to the embodiments of the present invention; and the following describes in detail, with reference to FIG. 5 and FIG. 6, an apparatus for transmitting a reference signal according to an embodiment of the present invention.

FIG. 5 shows a schematic block diagram of an apparatus 300 for transmitting a reference signal in D2D communication according to an embodiment of the present invention. As shown in FIG. 5, the apparatus 300 includes a processing unit 310 configured to enable a first user equipment to determine, from a communication resource for D2D communication, a target resource used to bear a RS, and control a receiving unit 320 and a sending unit 330 to transmit the RS using the target resource, where the target resource is according to characteristic information used in selecting the target resource, and the characteristic information used in selecting the target resource includes at least one of the following two items: characteristic information used to uniquely identify the first user equipment, and characteristic information used to uniquely identify a second user equipment that performs D2D communication with the first user equipment; the receiving unit 320 configured to receive the RS; and the sending unit 330 configured to send the RS.

In this embodiment of the present invention, a basis used in determining a target resource used to bear an RS may be stipulated in advance. As an example rather than limitation, it may be stipulated that a user equipment determines, according to characteristic information of an initiating end and or a receiving end of D2D communication, the target resource from a resource (including a time domain resource, a frequency domain resource, a space domain resource, or a code domain resource) for D2D communication. Or, it may be stipulated that a user equipment determines, from the resource (including the time domain resource, the frequency domain resource, the space domain resource, or the code domain resource) for D2D communication according to characteristic information of an initiating end and/or a receiving end of D2D communication, the first target resource, such as the time domain resource, used to bear a reference signal; and it is stipulated that the user equipment determines, from the resource (including the time domain resource, the frequency domain resource, the space domain resource, or the code domain resource) for D2D communication according to the characteristic information of the initiating end and/or the receiving end of D2D communication, the second target resource, such as the frequency domain resource, used to bear a reference signal. In this way, the processing unit 310 may determine a target resource according to a basis corresponding to the stipulation. It should be understood that the foregoing listed basis (characteristic information of an initiating end and/or a receiving end) for determining a first resource and basis (characteristic information of the initiating end and/or the receiving end) for determining a second resource may be the same, or may be different (for example, the first resource may be determined according to the characteristic information of the initiating end, and the second resource may be determined according to the characteristic information of the receiving end), which is not specifically limited in the present invention.

It should be noted that, the characteristic information is information (which may be, for example, a user identity of a user equipment, or a temporary identity of the user equipment in a communications system) that uniquely indicates the user equipment in the communications system, and the characteristic information can be obtained by a peer user equipment (for example, a user equipment may acquire characteristic information of a peer device during establishment of D2D communication). Description of a same or similar case is omitted in the following.

A resource used to bear a reference signal is determined according to characteristic information of a user equipment, so that the resource used to bear the reference signal is not limited to a fixed confined range, so that transmission of a reference signal between each terminal pair can still be ensured even in a case in which the number of terminal pairs that perform D2D communication is relatively large.

It should be understood that, the foregoing listed method for determining the target resource, and the parameters used in the method are merely for illustrative description, and the present invention is not limited thereto. Description of a same or similar case is omitted in the following.

In this embodiment of the present invention, the processing unit 310 of the first user equipment may independently select the target resource from the resource (including the time domain resource, the frequency domain resource, the space domain resource, or the code domain resource) for D2D communication, and this corresponds to case 4. Or, the second user equipment may independently select the target resource from the resource (including the time domain resource, the frequency domain resource, the space domain resource, or the code domain resource) for D2D communication, so that the first user equipment may determine the target resource according to notification from the second user equipment, and this corresponds to case 5. Or, a base station device may independently select the target resource from the resource (including the time domain resource, the frequency domain resource, the space domain resource, or the code domain resource) for D2D communication, so that the first user equipment and the second user equipment may determine the target resource according to notification from the base station device, and this corresponds to case 6. The following separately describes the foregoing listed three cases.

Case 4

The processing unit 310 is configured to select the target resource from the communication resource according to the characteristic information used in selecting the target resource; and the sending unit 330 is further configured to send first information to the second user equipment, where the first information is used to indicate the characteristic information used in selecting the target resource by the first user equipment, so that the second user equipment determines the target resource according to the first information; or configured to send second information to the second user equipment, where the second information is used to indicate the target resource, so that the second user equipment determines the target resource according to the second information.

To be specific, in this embodiment of the present invention, when the target resource is only one of the time domain resource, the frequency domain resource, the space domain resource, or the code domain resource, or when the target resource includes at least two of the time domain resource, the frequency domain resource, the space domain resource, or the code domain resource, and the at least two resources are both based on same characteristic information (such as characteristic information of a same user equipment or characteristic information of the two user equipments), the processing unit 310 of the first user equipment may select, according to the characteristic information of the first user equipment and/or the characteristic information of the second user equipment, the target resource from the resource for the D2D communication, or in other words, determine a mapping relationship between the characteristic information and the target resource.

For example, when SC-FDMA is used as an uplink multiple-access scheme, in order to maintain a single-carrier characteristic, all subcarriers (frequency domain resources) in a symbol can bear only a reference signal or data. In this way, the reference signal needs to occupy at least one symbol, which cannot be refined to a level of a RE. Therefore, in this case, selection of a frequency domain resource may not be considered. For example, a target resource where a subframe has only one symbol may be designed, as shown in FIG. 2B; all modulation is based on an extrapolation method, or an interpolation method may also be considered when there is an RS that can be borrowed in a neighboring subframe. Or, a target resource where a subframe has two symbols may be designed may be designed, as shown in FIG. 2C. When a channel is in a poor condition, more than two symbols may be used to send an RS, which is not specifically limited in the present invention. In this embodiment of the present invention, no matter one symbol, two symbols, or more symbols are used to send an RS, a resource (including the time domain resource, the frequency domain resource, the space domain resource, or the code domain resource) that sends the RS is not fixed, and a user equipment or a base station may select, from a D2D target resource according to characteristic information of the user equipment, a resource used to bear the RS.

a. Optionally, in this embodiment of the present invention, the processing unit 310 is configured to select a target pattern from at least two preset patterns according to the characteristic information used in selecting the target resource, where each pattern is used to indicate a resource that is in the communication resource and used to bear an RS; and configured to use a resource indicated by the target pattern and used to bear an RS as the target resource, where the second information is used to indicate the target pattern.

To be specific, multiple (such as eight) patterns may be set in advance, where the pattern indicates one or more symbols (an example of the target resource) used to bear an RS (such as a demodulation reference signal), in a subframe (a resource for D2D communication). FIG. 2A shows a pattern, FIG. 2B shows another pattern, and FIG. 2C shows still another pattern. The first user equipment may determine, according to characteristic information of a user equipment (the characteristic information of the first user equipment, or the characteristic information of the second user equipment, or the characteristic information of the first user equipment and the characteristic information of the second user equipment), a pattern used in current D2D communication. For example, a modulus operation may be performed on the total number of preset patterns using the characteristic information, to determine a digit (which, for example, may be represented using three bits), and the digit may be used to indicate a sequence number of the pattern, which is used in the current D2D communication, in the preset multiple (such as eight) patterns, so that the pattern used in the current D2D communication can be determined.

It should be noted herein that, when the characteristic information is a numerical value, the characteristic information may be directly used to determine a target resource (such as a sequence number of a pattern); when the characteristic information is expressed in another manner (such as, a letter), an characteristic parameter (denoted by S) corresponding to the characteristic information may be further determined using a preset algorithm (a function, a formula, or the like), for example, any formula of the foregoing formulas 1 to 3 may be used to determine the characteristic parameter S. Therefore, the characteristic parameter may be used to replace the characteristic information for calculation in the foregoing process. In this embodiment of the present invention, the characteristic parameter S may uniquely correspond to one user equipment or a pair of user equipments. Description of a same or similar case is omitted in the following. For ease of description, in the following descriptions, the characteristic parameter S is considered as a basis for selecting (or determining) a target resource.

b. Optionally, the processing unit 310 is configured to determine a deviation value according to the characteristic information used in selecting the target resource, where the deviation value is used to indicate a deviation, in a preset pattern, of the target resource relative to a preset resource used to bear an RS; and Configured to determine the target resource according to the deviation value and the pattern, where the second information is used to indicate the deviation value.

To be specific, a default pattern may be stipulated. For example, the pattern shown in FIG. 2A may be selected as the default pattern, and the characteristic parameter S is considered as a corresponding time domain shift. For example, S=2 represents that a symbol determined after a symbol, which is in the default pattern and used to bear an RS, moves rightwards for two units is the symbol (an example of the target resource) used to bear an RS in current D2D communication. In addition, if a numerical value of the characteristic parameter S exceeds the number of symbols in a subframe, a modulus operation is performed on the number of symbols in a subframe using the numerical value of the characteristic parameter S.

c. Optionally, in this embodiment of the present invention, the processing unit 310 is configured to determine a configured value according to the characteristic information used in selecting the target resource, where the configured value is used to indicate a location of the target resource in a preset pattern; and determine the target resource according to the configured value and the pattern, where the second information is used to indicate the configured value.

To be specific, a characteristic parameter S may be used to indicate one or more symbols in a time domain resource. For example, the characteristic parameter S is used to indicate a sequence number of a symbol in all symbols, so that the symbol may be determined, and the symbol is used to bear an RS. In addition, if a numerical value of the characteristic parameter S exceeds the number of symbols, a modulus operation is performed on the number of symbols using the numerical value of the characteristic parameter S, and the sequence number of the symbol in all the symbols is determined according to the modulus value.

For another example, when OFDMA is used as an uplink multiple-access scheme, as shown in FIG. 3A, it is allowed that two ports (space domain resource) use one RE, where a same sequence is used, and different OCCs are used for differentiation; and sequences of different cells are orthogonal. One sequence is used on a symbol, and the sequence itself may allow 12 CS. Therefore, a pattern with two or four ports may be directly used (as shown in FIG. 3A). In this case, a user equipment or a base station may select, from a D2D target resource according to characteristic information (or a characteristic parameter) of a user equipment, a resource used to bear an RS.

In addition, in this embodiment of the present invention, considering that a communication distance is relatively short in D2D communication, and relatively speaking, a channel change is not too radical; as a result, a relatively small number of REs may be used to bear an RS (as shown in FIG. 3B or FIG. 3C). Therefore, multiple subsets may be extracted from the pattern with two ports or four ports, and then different UE pairs are made to use different subsets. In this case, a user equipment or a base station may select, from a D2D target resource according to characteristic information (or a characteristic parameter) of a user equipment, a resource used to bear an RS.

d. Multiple patterns may be set in advance, where the pattern indicates a symbol (an example of a first target resource) that is in a subframe and carries an RS and/or a subcarrier (an example of a second target resource). For example, FIG. 3B is a pattern, and FIG. 3C is a pattern. In addition, a pattern to be used is determined according to a characteristic parameter S. For example, the pattern to be used may be determined by performing a modulus operation on a total number of patterns using the characteristic parameter S, and if multiple symbols (an example of a target resource) are used to bear an RS, resources corresponding to the multiple symbols may be not fixed, that is, different symbols may be separately selected according to different characteristic parameters S (for example, one symbol is selected according to $S_1$, and another symbol is selected according to $S_2$).

e. One pattern may be selected as a default pattern (for example, as shown in FIG. 3A, FIG. 3B, or FIG. 3C), and a parameter S is considered as a corresponding time domain shift/frequency domain shift/space domain shift/code domain shift, for example, S=2 represents that a symbol determined after a symbol, which is in the default pattern and used to bear an RS, moves rightwards for two units is the symbol (an example of a target resource) used to bear an RS in current D2D communication. In addition, if a numerical value of the parameter S exceeds the number of symbols in a subframe, a modulus operation is performed on the number of symbols in a subframe using the numerical value of the parameter S. Likewise, the parameter S may also be used to indicate a subcarrier (frequency domain resource), an antenna port (space domain resource), an RS sequence, an OCC, or a CS.

f. A characteristic parameter S may be used to indicate one or more symbols, such as a sequence number of a symbol in all symbols, in a time domain frequency; and the symbol is used to bear an RS. In addition, if a numerical value of the characteristic parameter S exceeds the number of symbols, a modulus operation is performed on the number of symbols using the numerical value of the characteristic parameter S, and the sequence number of the symbol in all the symbols is determined according to the modulus value. Likewise, the parameter S may also be used to indicate a subcarrier (frequency domain resource), an antenna port (space domain resource), an RS sequence, an OCC, or a CS.

Therefore, in the apparatus for transmitting a reference signal according to this embodiment of the present invention, an overhead of a reference signal can be effectively reduced.

It should be understood that the foregoing listed methods for selecting a target resource (determining a mapping relationship between characteristic information and a target resource) are merely for illustrative description, and the present invention is not limited thereto.

It should be noted that, in this embodiment of the present invention, if multiple resources (such as symbols for bearing an RS) are used to bear an RS (for example, two or more symbols in a subframe are used to bear an RS), relative locations of the multiple resources may be fixed, that is, a same shift (such as a time domain shift) may be obtained by means of calculation according to same characteristic information. Or, relative locations of the multiple resources may be not fixed, that is, different time domain shifts may be obtained by means of calculation according to different characteristic parameters S, so as to select different resources (for example, one symbol is selected according to $S_1$, and another symbol is selected according to $S_2$).

In this embodiment of the present invention, the target resource includes at least two of the time domain resource, the frequency domain resource, the space domain resource, or the code domain resource, where the processing unit 310 is configured to select a first target resource according to the characteristic information of the first user equipment and/or the characteristic information of the second user equipment; and configured to select a second target resource according to the characteristic information of the first user equipment and/or the characteristic information of the second user equipment.

To be specific, in this embodiment of the present invention, when the target resource includes at least two of the time domain resource, the frequency domain resource, the space domain resource, or the code domain resource, and the at least two resources are respectively determined according to characteristic information of different user equipments, the processing unit 310 of the first user equipment may select the first target resource from the resource for the D2D communication according to the characteristic information of the first user equipment, or in other words, determine a mapping relationship between the characteristic information of the first user equipment and the first target resource. In addition, the processing unit 310 of the first user equipment may select, according to the characteristic information of the second user equipment, a second target resource from the resource for the D2D communication, or in other words, determine a mapping relationship between the characteristic information of the second user equipment and the second target resource. It should be noted herein that, in this embodiment of the present invention, the first target resource and the second target resource are different resources, but specific types of the first target resource and the second target resource are not limited, that is, the first target resource may be one or more of the time domain resource, the frequency domain resource, the space domain resource, or the code domain resource, and the second target resource may be a resource, which is different from the first target resource, in the time domain resource, the frequency domain resource, the space domain resource, or the code domain resource.

Processes herein in which the processing unit 310 of the first user equipment determines and selects a first pattern according to the characteristic information of the first user equipment and/or the characteristic information of the second user equipment, and the processing unit 310 of the first user equipment determines and selects a second pattern according to the characteristic information of the first user equipment and/or the characteristic information of the second user equipment are similar to processes in methods a to f; and descriptions of the processes are omitted herein to avoid repeated description.

Optionally, in this embodiment of the present invention, a method for the second user equipment to determine a target resource may be the same as the method for the first user equipment to select a target resource. Therefore, in this case, the first user equipment needs to notify the second user equipment of whether the target resource is determined according to the characteristic information of the first user equipment or determined according to the characteristic information of the second user equipment, so as to ensure that the second user equipment can accurately determine the target resource. In this embodiment of the present invention, a process in which the second user equipment determines a target resource according to characteristic information is similar to a process in which the second user equipment selects a target resource according to characteristic information; and descriptions of the process are omitted herein to avoid repeated description.

Optionally, in this embodiment of the present invention, after selecting the target resource, the processing unit 310 of the first user equipment may further directly send information (such as a sequence number, in a subframe, of a symbol that carries an RS), which indicates the target resource, to the second user equipment, so that the second user equipment may determine the target resource according to the information that indicates the target resource.

Case 5

Optionally, the target resource is selected from the communication resource by the second user equipment according to characteristic information used in selecting the target resource; and the receiving unit 320 is further configured to receive third information sent by the second user equipment, where the third information is used to indicate the characteristic information used in selecting the target resource by the second user equipment; and the processing unit 310 is further configured to determine the target resource according to the third information; or the receiving unit 320 is further configured to receive fourth information sent by the second user equipment, where the fourth information is used to indicate the target resource; and the processing unit 310 is further configured to determine the target resource according to the fourth information.

To be specific, in this embodiment of the present invention, when the target resource is only one of the time domain resource, the frequency domain resource, the space domain resource, or the code domain resource, or when the target resource includes at least two of the time domain resource, the frequency domain resource, the space domain resource, or the code domain resource, and the at least two resources are both determined according to characteristic information of a same user equipment, the second user equipment may select, according to the characteristic information of the first user equipment and/or the characteristic information of the second user equipment, the target resource from the resource for the D2D communication, or in other words, determine a mapping relationship between the characteristic information and the target resource.

When the target resource includes at least two of the time domain resource, the frequency domain resource, the space domain resource, or the code domain resource, and the at least two resources are respectively determined according to characteristic information of different user equipments, the second user equipment may select, according to the characteristic information of the first user equipment, a first target resource from the resource for the D2D communication, or in other words, determine a mapping relationship between the characteristic information of the first user equipment and the first target resource. In addition, the second user equipment may select, according to the characteristic information of the second user equipment, a second target resource from the resource for the D2D communication, or in other words, determine a mapping relationship between the characteristic information of the second user equipment and the second target resource. It should be noted herein that, in this embodiment of the present invention, the first target resource and the second target resource are different resources, but specific types of the first target resource and the second target resource are not limited, that is, the first target resource may be one or more of the time domain resource, the frequency domain resource, the space domain resource, or the code domain resource, and the second target resource may be a resource, which is different from the first target resource, in the time domain resource, the frequency domain resource, the space domain resource, or the code domain resource.

In this embodiment of the present invention, a method and a process for the second user equipment to select a target resource is the same as a method and a process for the first user equipment to select a target resource; and descriptions of the method and the process are omitted herein to avoid repeated description.

Optionally, in this embodiment of the present invention, a method for the first user equipment to determine a target resource may be the same as the method for the second user equipment to select a target resource. Therefore, in this case, the second user equipment needs to notify the first user equipment of whether the target resource is determined according to the characteristic information of the first user equipment or determined according to the characteristic information of the second user equipment, so as to ensure that the first user equipment can accurately determine the target resource. In this embodiment of the present invention, a process in which the second user equipment determines a target resource according to characteristic information is similar to a process in which the first user equipment selects a target resource according to characteristic information; and descriptions of the process are omitted herein to avoid repeated description.

Optionally, in this embodiment of the present invention, after selecting the target resource, the second user equipment may further directly send information (such as a sequence number, in a subframe, of a symbol that carries an RS), which indicates the target resource, to the first user equipment, so that the first user equipment may determine the target resource according to the information that indicates the target resource.

Case 6

The target resource is selected by the base station device according to characteristic information used in selecting the target resource; and the receiving unit 320 is further configured to receive fifth information sent by the base station device, where the fifth information is used to indicate the characteristic information used in selecting the target resource by the base station device; and the processing unit 310 is further configured to determine the target resource according to the fifth information; or the receiving unit 320 is further configured to receive sixth information sent by the base station device, where the sixth information is used to indicate the target resource; and the processing unit 310 is further configured to determine the target resource according to the sixth information.

To be specific, in this embodiment of the present invention, when the target resource is only one of the time domain resource, the frequency domain resource, the space domain resource, or the code domain resource, or when the target resource includes at least two of the time domain resource, the frequency domain resource, the space domain resource, or the code domain resource, and the at least two resources are both determined according to characteristic information of a same user equipment, the base station device may select, according to the characteristic information of the first user equipment and/or the characteristic information of the second user equipment, the target resource from the resource for the D2D communication, or in other words, determine a mapping relationship between the characteristic information and the target resource.

When the target resource includes at least two of the time domain resource, the frequency domain resource, the space domain resource, or the code domain resource, and the at least two resources are respectively determined according to characteristic information of different user equipments, the base station device may select, according to the characteristic information of the first user equipment, a first target resource from the resource for the D2D communication, or in other words, determine a mapping relationship between the characteristic information of the first user equipment and the first target resource. In addition, the base station device may select, according to the characteristic information of the second user equipment, a second target resource from the resource for the D2D communication, or in other words, determine a mapping relationship between the characteristic information of the second user equipment and the second target resource. It should be noted herein that, in this embodiment of the present invention, the first target resource and the second target resource are different resources, but specific types of the first target resource and the second target resource are not limited, that is, the first target resource may be one or more of the time domain resource, the frequency domain resource, the space domain resource, or the code domain resource, and the second target resource may be a resource, which is different from the first target resource, in the time domain resource, the frequency domain resource, the space domain resource, or the code domain resource.

In this embodiment of the present invention, a method and a process for the base station device to select a target resource is the same as a method and a process for the first user equipment to select a target resource; and descriptions of the method and the process are omitted herein to avoid repeated description.

Optionally, in this embodiment of the present invention, a method for the first user equipment to determine a target resource is the same as the method for the base station device to select a target resource. Therefore, in this case, the base station device needs to notify the first user equipment of whether the target resource is determined according to the characteristic information of the first user equipment or determined according to the characteristic information of the second user equipment, so as to ensure that the first user equipment can accurately determine the target resource. In this embodiment of the present invention, a process in which the second user equipment determines a target resource according to characteristic information is similar to a process in which the first user equipment selects a target resource according to characteristic information, and descriptions of the process are omitted herein to avoid repeated description.

Optionally, in this embodiment of the present invention, after selecting the target resource, the base station device may further directly send information (such as a sequence number, in a subframe, of a symbol that carries an RS), which indicates the target resource, to the first user equipment, so that the receiving unit 320 of the first user equipment may determine the target resource according to the information that indicates the target resource.

In the apparatus for transmitting a reference signal according to this embodiment of the present invention, a target resource used to bear a reference signal is determined according to characteristic information of a user equipment that performs D2D communication, which can implement dynamic configuration of a resource, so that transmission of a reference signal between each terminal pair can still be ensured even in a case in which the number of terminal pairs that perform D2D communication is relatively large.

The apparatus 300 for transmitting a reference signal according to this embodiment of the present invention may correspond to a user equipment (the first user equipment) in the method in this embodiment of the present invention, the foregoing other operations and/or functions of units and modules in the apparatus 300 for transmitting a reference signal are separately for implementing corresponding processes in the method 100 in FIG. 1, which, for brevity, is not described herein again.

FIG. 6 shows a schematic block diagram of an apparatus 400 for transmitting a reference signal in D2D communication according to an embodiment of the present invention. As shown in FIG. 6, the apparatus 400 includes an acquiring unit 410 configured to acquire characteristic information used in selecting a target resource, where the characteristic information used in selecting the target resource includes at least one of the following two items: characteristic information used to uniquely identify the first user equipment, and characteristic information used to uniquely identify a second user equipment that performs D2D communication with the first user equipment; a processing unit 420 configured to select, from a communication resource for the D2D communication according to the characteristic information used in selecting the target resource, the target resource used to bear a RS; and a sending unit 430 configured to send fifth information to at least one user equipment of the first user equipment and the second user equipment, where the fifth information is used to indicate the characteristic information used in selecting the target resource, so that the at least one user equipment determines, according to the fifth information, the target resource used to bear the RS; or send sixth indication information to the at least one user equipment, where the sixth information is used to indicate the target resource, so that the at least one user equipment determines, according to the sixth information, the target resource used to bear the RS.

To be specific, the acquiring unit 410 of a base station device may acquire characteristic information of a user equipment that performs D2D communication. It should be noted that, when the characteristic information is a numerical value, the characteristic information may be directly used to determine the target resource, such as a sequence number of a pattern, used to bear an RS (which is referred to as the target resource for short in the following). When the characteristic information is expressed in another manner, a characteristic parameter (denoted by S) corresponding to the characteristic information may be further determined according to a preset algorithm (a function, a formula, or the like), for example, the characteristic parameter S may be determined using any formula of the foregoing formulas 1 to 3. In this embodiment of the present invention, a mapping relationship between the characteristic information and the characteristic parameter may be linear, or may be nonlinear, which is not specifically limited in the present invention. Therefore, the characteristic parameter may be used to replace the characteristic information for calculation in the foregoing process. In this embodiment of the present invention, the characteristic parameter S may uniquely correspond to one user equipment or a pair of user equipments. Description of a same or similar case is omitted in the following. For ease of description, in the following descriptions, the characteristic parameter S is considered as a basis for selecting (or determining) a target resource.

Optionally, in this embodiment of the present invention, a basis used in determining a target resource used to bear an RS may be stipulated. As an example rather than limitation, it may be stipulated that a user equipment determines, according to characteristic information (or a determined characteristic parameter corresponding to the characteristic information) of an initiating end and (or a receiving end) of D2D communication, the target resource from the resource (including a time domain resource, a frequency domain resource, a space domain resource, or a code domain resource) for D2D communication. Or, it may be stipulated that a user equipment determines, from the resource (including the time domain resource, the frequency domain resource, the space domain resource, or the code domain resource) for D2D communication according to characteristic information of an initiating end of D2D communication, a first resource, such as the time domain resource, used to bear a reference signal; and it is stipulated that the user equipment determines, from the resource (including the time domain resource, the frequency domain resource, the space domain resource, or the code domain resource) for D2D communication according to the characteristic information of the initiating end of D2D communication, a second resource, such as the frequency domain resource, used to bear a reference signal. In this way, the processing unit 420 of the base station device may determine, according to the foregoing stipulation, a target resource using a basis corresponding to the stipulation.

A resource used to bear a reference signal is determined according to characteristic information of a user equipment, so that the resource used to bear the reference signal is not limited to a fixed confined range, so that transmission of a reference signal between each terminal pair can still be ensured even in a case in which the number of terminal pairs that perform D2D communication is relatively large.

It should be understood that, the foregoing listed method for determining the target resource, and the parameters used in the method are merely for illustrative description, and the present invention is not limited thereto. Description of a same or similar case is omitted in the following.

In this embodiment of the present invention, when the target resource is only one of the time domain resource, the frequency domain resource, the space domain resource, or the code domain resource, or when the target resource include at least two of the time domain resource, the frequency domain resource, the space domain resource, or the code domain resource, and the at least two resources are both based on same characteristic information (such as characteristic information of a same user equipment or characteristic information of the two user equipments), the processing unit 410 is configured to select the target resource according to the characteristic information of the first user equipment and/or the characteristic information of the second user equipment.

To be specific, in this embodiment of the present invention, when the target resource is only one of the time domain resource, the frequency domain resource, the space domain resource, or the code domain resource, or when the target resource includes at least two of the time domain resource, the frequency domain resource, the space domain resource, or the code domain resource, and the at least two resources are both determined according to same characteristic information, the base station device may select, according to the characteristic information of the first user equipment and/or the characteristic information of the second user equipment, the target resource from the resource for the D2D communication, or in other words, determine a mapping relationship between the characteristic information and the target resource.

For example, when SC-FDMA is used as an uplink multiple-access scheme, in order to maintain a single-carrier characteristic, all subcarriers (frequency domain resources) in a symbol can bear only a reference signal or data. In this way, the reference signal needs to occupy at least one symbol, which cannot be refined to a level of a RE. Therefore, in this case, selection of a frequency domain resource may not be considered. For example, a target resource where a subframe has only one symbol may be designed, as shown in FIG. 2B; all modulation is based on an extrapolation method, or an interpolation method may also be considered when there is an RS that can be borrowed in a neighboring subframe. Or, a target resource where a subframe has two symbols may be designed may be designed, as shown in FIG. 2C. When a channel is in a poor condition, more than two symbols may be used to send an RS, which is not specifically limited in the present invention. In this embodiment of the present invention, no matter if one symbol, two symbols, or more symbols are used to send an RS, a resource (including the time domain resource, the frequency domain resource, the space domain resource, or the code domain resource) that sends the RS is not fixed, and a user equipment or a base station may select, from a D2D target resource according to characteristic information of the user equipment, a resource used to bear the RS.

g. Optionally, in this embodiment of the present invention, the processing unit 420 is configured to select a target pattern from at least two preset patterns according to the characteristic information used in selecting the target resource, where each pattern is used to indicate a resource that is in the communication resource and used to bear an RS; and configured to use an RS resource indicated by the target pattern as the target resource, where the sixth information is used to indicate the target pattern.

To be specific, multiple (such as eight) patterns may be set in advance, where the pattern indicates one or more symbols (an example of the target resource) used to bear an RS (such as a demodulation reference signal), in a subframe (a resource for D2D communication). FIG. 2A shows a pattern, FIG. 2B shows another pattern, and FIG. 2C shows still another pattern. The base station device may determine, according to characteristic information of a user equipment (the characteristic information of the first user equipment, or the characteristic information of the second user equipment, or the characteristic information of the first user equipment and the characteristic information of the second user equipment), a pattern used in current D2D communication. For example, a modulus operation may be performed on the total number of preset patterns using the characteristic information, to determine a digit (which, for example, may be represented using three bits), and the digit may be used to indicate a sequence number of the pattern, which is used in the current D2D communication, in the preset multiple (such as eight) patterns, so that the pattern used in the current D2D communication can be determined.

It should be noted herein that, when the characteristic information is a numerical value, the characteristic information may be directly used to determine a target resource (such as a sequence number of a pattern); when the characteristic information is expressed in another manner (such as, a letter), an characteristic parameter (denoted by S) corresponding to the characteristic information may be further determined using a preset algorithm (a function, a formula, or the like), for example, any formula of the foregoing formulas 1 to 3 may be used to determine the characteristic parameter S. In this embodiment of the present invention, a mapping relationship between the characteristic information and the characteristic parameter may be linear, or may be nonlinear, which is not specifically limited in the present invention. Therefore, the characteristic parameter may be used to replace the characteristic information for calculation in the foregoing process. In this embodiment of the present invention, the characteristic parameter S may uniquely correspond to one user equipment or a pair of user equipments.

h. Optionally, in this embodiment of the present invention, the processing unit 420 is configured to determine a deviation value according to the characteristic information used in selecting the target resource, where the deviation value is used to indicate a deviation, in a preset pattern, of the target resource relative to a preset RS resource used to bear an RS, and the pattern is used to indicate an RS resource that is in the communication resource and used to bear an RS; and configured to determine the target resource according to the deviation value, where the sixth information is used to indicate the deviation value.

To be specific, a default pattern may be stipulated. For example, the pattern shown in FIG. 2A may be selected as the default pattern, and the characteristic parameter S is considered as a corresponding time domain shift. For example, S=2 represents that a symbol determined after a symbol, which is in the default pattern and used to bear an RS, moves rightwards for two units is the symbol (an example of the target resource) used to bear an RS in current D2D communication. In addition, if a numerical value of the characteristic parameter S exceeds the number of symbols in a subframe, a modulus operation is performed on the number of symbols in a subframe using the numerical value of the characteristic parameter S.

i. Optionally, in this embodiment of the present invention, the processing unit 420 is configured to determine a configured value according to the characteristic information used in selecting the target resource, where the configured value is used to indicate a location of the target resource in the communication resource; and configured to determine the target resource according to the configured value, where the sixth information is used to indicate the configured value.

To be specific, a characteristic parameter S may be used to indicate one or more symbols in a time domain resource. For example, the characteristic parameter S is used to indicate a sequence number of a symbol in all symbols, so that the symbol may be determined, and the symbol is used to bear an RS. In addition, if a numerical value of the characteristic parameter S exceeds the number of symbols, a modulus operation is performed on the number of symbols using the numerical value of the characteristic parameter S, and the sequence number of the symbol in all the symbols is determined according to the modulus value.

For another example, when OFDMA is used as an uplink multiple-access scheme, as shown in FIG. 3A, it is allowed that two ports (space domain resource) use one RE, where a same sequence is used, and different OCC are used for differentiation; and sequences of different cells are orthogonal. One sequence is used on a symbol, and the sequence itself may allow 12 CS. Therefore, a pattern with two or four ports (port) may be directly used (as shown in FIG. 3A). In this case, a user equipment or a base station may select, from a D2D target resource according to characteristic information (or a characteristic parameter) of a user equipment, a resource used to bear an RS.

In addition, in this embodiment of the present invention, considering that a communication distance is relatively short in D2D communication, and relatively speaking, a channel change is not too radical; as a result, a relatively small number of REs may be used to bear an RS (as shown in FIG. 3B or FIG. 3C). Therefore, multiple subsets may be extracted from the pattern with two ports or four ports, and then different UE pairs are made to use different subsets. In this case, a user equipment or a base station may select, from a D2D target resource according to characteristic information (or a characteristic parameter) of a user equipment, a resource used to bear an RS.

j. Multiple patterns may be set in advance, where the pattern indicates a symbol (an example of a first target resource) that is in a subframe and carries an RS and/or a subcarrier (an example of a second target resource). For example, FIG. 3B is a pattern, and FIG. 3C is a pattern. In addition, a pattern to be used is determined according to a characteristic parameter S. For example, the pattern to be used may be determined by performing a modulus operation on a total number of patterns using the characteristic parameter S, and if multiple symbols (an example of a target resource) are used to bear an RS, resources corresponding to the multiple symbols may be not fixed, that is, different symbols may be separately selected according to different characteristic parameters S (for example, one symbol is selected according to $S_1$, and another symbol is selected according to $S_2$).

k. One pattern may be selected as a default pattern (for example, as shown in FIG. 3A, FIG. 3B, or FIG. 3C), and a parameter S is considered as a corresponding time domain shift/frequency domain shift/space domain shift/code domain shift (shift), for example, S=2 represents that a symbol determined after a symbol, which is in the default pattern and used to bear an RS, moves rightwards for two units is the symbol (an example of a target resource) used to bear an RS in current D2D communication. In addition, if a numerical value of the parameter S exceeds the number of symbols in a subframe, a modulus operation is performed on the number of symbols in a subframe using the numerical value of the parameter S. Likewise, the parameter S may also be used to indicate a subcarrier (frequency domain resource), an antenna port (space domain resource), an RS sequence, an OCC, or a CS.

l. A characteristic parameter S may be used to indicate one or more symbols in a time domain frequency, such as a sequence number of a symbol in all symbols, and the symbol is used to bear an RS. In addition, if a numerical value of the characteristic parameter S exceeds the number of symbols, a modulus operation is performed on the number of symbols using the numerical value of the characteristic parameter S, and the sequence number of the symbol in all the symbols is determined according to the modulus value. Likewise, the parameter S may also be used to indicate a subcarrier (frequency domain resource), an antenna port (space domain resource), an RS sequence, an OCC, or a CS.

Therefore, in the apparatus for transmitting a reference signal according to this embodiment of the present invention, an overhead of a reference signal can be effectively reduced.

It should be understood that the foregoing listed methods for selecting a target resource (determining a mapping relationship between characteristic information and a target resource) are merely for illustrative description, and the present invention is not limited thereto.

It should be noted that, in this embodiment of the present invention, if multiple resources (such as symbols for bearing an RS) are used to bear an RS (for example, two or more symbols in a subframe are used to bear an RS), relative locations of the multiple resources may be fixed, that is, a same shift (such as a time domain shift) may be obtained by means of calculation according to same characteristic information. Or, relative locations of the multiple resources may be not fixed, that is, different time domain shifts may be obtained by means of calculation according to different characteristic parameters S, so as to select different resources (for example, one symbol is selected according to $S_1$, and another symbol is selected according to $S_2$).

In this embodiment of the present invention, the target resource includes at least two of the time domain resource, the frequency domain resource, the space domain resource, or the code domain resource, where the processing unit 420 is configured to select a first target resource according to the characteristic information of the first user equipment and/or the characteristic information of the second user equipment; and configured to select a second target resource according to the characteristic information of the first user equipment and/or the characteristic information of the second user equipment.

To be specific, in this embodiment of the present invention, when the target resource includes at least two of the time domain resource, the frequency domain resource, the space domain resource, or the code domain resource, and the at least two resources are respectively determined according to characteristic information of different user equipments, the base station device may select the first target resource from the resource for the D2D communication according to the characteristic information of the first user equipment, or in other words, determine a mapping relationship between the characteristic information of the first user equipment and the first target resource. In addition, the base station device may select, according to the characteristic information of the second user equipment, a second target resource from the resource for the D2D communication, or in other words, determine a mapping relationship between the characteristic information of the second user equipment and the second target resource. It should be noted herein that, in this embodiment of the present invention, the first target resource and the second target resource are different resources, but specific types of the first target resource and the second target resource are not limited, that is, the first target resource may be one or more of the time domain resource, the frequency domain resource, the space domain resource, or the code domain resource, and the second target resource may be a resource, which is different from the first target resource, in the time domain resource, the frequency domain resource, the space domain resource, or the code domain resource.

Processes herein in which the base station device determines and selects a first pattern according to the characteristic information of the first user equipment and/or the characteristic information of the second user equipment, and the base station device determines and selects a second pattern according to the characteristic information of the first user equipment and/or the characteristic information of the second user equipment are similar to processes in methods g to l; and descriptions of the processes are omitted herein to avoid repeated description.

Optionally, in this embodiment of the present invention, a method for a user equipment to determine a target resource is the same as the method for the base station device to select a target resource. Therefore, in this case, the base station device needs to notify the first user equipment of whether the target resource is determined according to the characteristic information of the first user equipment or determined according to the characteristic information of the second user equipment, so as to ensure that the user equipment can accurately determine the target resource. In this embodiment of the present invention, a process in which a user equipment determines a target resource according to characteristic information is similar to a process in which the base station device selects a target resource according to characteristic information; and descriptions of the process are omitted herein to avoid repeated description.

Optionally, in this embodiment of the present invention, after selecting the target resource, the base station device may further directly send information (such as a sequence number, in a subframe, of a symbol that carries an RS), which indicates the target resource, to a user equipment, so that the user equipment may determine the target resource according to the information that indicates the target resource.

In the apparatus for transmitting a reference signal according to this embodiment of the present invention, a target resource used to bear a reference signal is determined according to characteristic information of a user equipment that performs D2D communication, which can implement dynamic configuration of a resource, so that transmission of a reference signal between each terminal pair can still be ensured even in a case in which the number of terminal pairs that perform D2D communication is relatively large.

The apparatus 400 for transmitting a reference signal according to this embodiment of the present invention may correspond to the base station device in the method in this embodiment of the present invention, the foregoing other operations and/or functions of units and modules in the apparatus 400 for transmitting a reference signal are separately for implementing corresponding processes in the method 200 in FIG. 4, which, for brevity, is not described herein again.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for transmitting a reference signal in device-to-device (D2D) communication, the method comprising:

determining, by a first user equipment, a target resource based on a predetermined function of at least one of first characteristic information of the first user equipment or second characteristic information of a second user equipment, wherein the target resource comprises at least one of a time domain resource, a frequency domain resource, a space domain resource, or a code domain resource, wherein determining the target resource comprises determining a characteristic parameter S, wherein $S=f(X1)$ when only the first characteristic information is used to determine the target resource, wherein $S=f(X2)$ when only the second characteristic information is used to determine the target resource, wherein $S=f(X1, X2)$ when the first characteristic information and the second characteristic information are used to determine the target resource, wherein X1 is the first characteristic information, and wherein X2 is the second characteristic information; and transmitting, by the first user equipment, a reference symbol to a second user equipment using the target resource, wherein the second user equipment performs D2D communication with the first user equipment.

2. The method of claim 1, wherein before transmitting the reference symbol to the second user equipment, the method further comprises sending, by the first user equipment, first information to the second user equipment, and wherein the first information indicates one or more of the first characteristic information or the second characteristic information used in determining the target resource by the first user equipment.

3. A first user equipment comprising:

a transmitter; and a processor coupled to the transmitter and configured to:
determine a target resource based on a predetermined function of at least one of first characteristic information of the first user device or second characteristic information of a second user device, wherein the target resource comprises at least one of a time domain resource, a frequency domain resource, a space domain resource, or a code domain resource;
determine a characteristic parameter S, wherein $S=f(X1)$ when only the first characteristic information is used to determine the target resource, wherein $S=f(X2)$ when only the second characteristic information is used to determine the target resource, wherein $S=f(X1, X2)$ when the first characteristic information and the second characteristic information are used to determine the target resource, and wherein X1 is the first characteristic information and X2 is the second characteristic information; and
transmit, via the transmitter, a reference symbol to a second user equipment using the target resource, wherein the second user equipment performs D2D communication with the first user equipment.

4. The apparatus of claim 3, wherein the processor is further configured to transmit, via the transmitter, first information to the second user equipment, and wherein the first information indicates one or more of the first characteristic information or the second characteristic information used in determining the target resource by the first user equipment.

5. The method of claim 1, wherein the first characteristic information comprises a first non-numeric value, and wherein the second characteristic information comprises a second non-numeric value.

6. The method of claim 1, wherein determining the target resource comprises:

determining a deviation based on one or more of the first characteristic information or the second characteristic information; and selecting the target resource based upon the deviation and a preset pattern.

7. The method of claim 6, wherein the deviation comprises an integer value, and wherein selecting the target resource based upon the deviation and the preset pattern comprises determining a symbol shifted by the integer value relative to the preset pattern.

8. The first user equipment of claim 3, wherein the first characteristic information comprises a first non-numeric value, and wherein the second characteristic information comprises a second non-numeric value.

9. The first user equipment of claim 3, wherein the processor is further configured to:

determine a deviation based on one or more of the first characteristic information or the second characteristic information; and select the target resource based upon the deviation and a preset pattern.

10. The first user equipment of claim 9, wherein the deviation comprises an integer value, and wherein the processor is further configured to determine a symbol shifted by the integer value relative to the preset pattern.

* * * * *